United States Patent
O'Haese et al.

(10) Patent No.: US 10,822,533 B2
(45) Date of Patent: Nov. 3, 2020

(54) FLUORINATED PRESSURE SENSITIVE ADHESIVES AND ARTICLES THEREOF

(71) Applicant: 3M INNOVATIVE PROPERTIES COMPANY, St. Paul, MN (US)

(72) Inventors: Francois C. O'Haese, Antwerp (BE); Tatsuo Fukushi, Woodbury, MN (US); Katherine A. Gibney, St. Paul, MN (US); Klaus Hintzer, Kastl (DE); Tom Opstal, Laarne (BE); Jayshree Seth, Woodbury, MN (US); David J. Yarusso, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 19 days.

(21) Appl. No.: 16/322,146

(22) PCT Filed: Aug. 9, 2017

(86) PCT No.: PCT/US2017/046002
§ 371 (c)(1),
(2) Date: Jan. 31, 2019

(87) PCT Pub. No.: WO2018/031604
PCT Pub. Date: Feb. 15, 2018

(65) Prior Publication Data
US 2019/0177586 A1 Jun. 13, 2019

Related U.S. Application Data

(60) Provisional application No. 62/372,827, filed on Aug. 10, 2016.

(51) Int. Cl.
| | | |
|---|---|---|
| *C09J 201/04* | (2006.01) | |
| *C09J 7/38* | (2018.01) | |
| *C09J 127/16* | (2006.01) | |
| *C08F 14/22* | (2006.01) | |
| *C08F 14/26* | (2006.01) | |
| *C08F 14/28* | (2006.01) | |
| *C08K 5/00* | (2006.01) | |

(52) U.S. Cl.
CPC .............. *C09J 201/04* (2013.01); *C09J 7/38* (2018.01); *C09J 127/16* (2013.01); *C08F 14/22* (2013.01); *C08F 14/26* (2013.01); *C08F 14/28* (2013.01); *C08K 5/0016* (2013.01); *C08L 2205/025* (2013.01); *C08L 2205/03* (2013.01); *C09J 2201/606* (2013.01); *C09J 2203/326* (2013.01); *C09J 2205/102* (2013.01)

(58) Field of Classification Search
CPC ...... C09J 201/04; C09J 133/16; C09J 127/16; C09J 7/38; C09J 2203/326; C09J 2205/102; C09J 2201/606; C08L 27/16; C08L 101/04; C08L 33/16; C08L 2205/025; C08L 2205/03; C08F 14/28; C08F 14/22; C08F 14/26; C08K 5/0016
See application file for complete search history.

(56) References Cited

U.S. PATENT DOCUMENTS

| | | |
|---|---|---|
| 4,000,356 A | 12/1976 | Weisgerber |
| 4,197,380 A | 4/1980 | Chao |
| 4,737,559 A | 4/1988 | Kellen |
| 5,143,761 A | 9/1992 | Chiotis |
| 5,208,305 A | 5/1993 | Grootaert |
| 5,276,175 A | 1/1994 | Dams |
| 5,639,837 A | 6/1997 | Farnham |
| H1736 H * | 6/1998 | Legare et al. ................ 525/194 |
| 6,525,127 B1 | 2/2003 | Jariwala |
| 6,664,354 B2 | 12/2003 | Savu |
| 6,693,152 B2 | 2/2004 | Kaspar |
| 7,049,379 B2 | 5/2006 | Jariwala |
| 7,138,470 B2 | 11/2006 | Fukushi |
| 8,835,551 B2 | 9/2014 | Fukushi |
| 2003/0104200 A1 | 6/2003 | Holguin |
| 2015/0240134 A1 | 8/2015 | Keite-Telgenbuscher |

FOREIGN PATENT DOCUMENTS

| | | |
|---|---|---|
| EP | 0075191 | 3/1983 |
| EP | 0288830 | 11/1988 |
| EP | 0355025 | 2/1990 |
| EP | 0399543 | 11/1990 |
| EP | 2868674 | 5/2015 |
| JP | H08-134422 | 5/1996 |
| JP | 2015-151432 | 8/2015 |
| JP | 2015-160915 | 9/2015 |
| WO | WO 2012-006487 | 1/2012 |
| WO | WO 2014-029545 | 2/2014 |
| WO | WO 2014-047782 | 4/2014 |
| WO | WO 2018-031512 | 2/2018 |
| WO | WO 2018-031554 | 2/2018 |

OTHER PUBLICATIONS

Chang, Viscoelastic Windows of Pressure-Sensitive Adhesives, Journal of Adhesion, 1991, vol. 34, pp. 189-200.
Wang, "Preparation and Characterization of Fluorinated Acrylic Pressure Sensitive Adhesives for Low Surface Energy Substrates," Journal of Fluorine Chemistry, 2015, vol. 180, pp. 103-109.
International Search Report for PCT International Application No. PCT/US2017/046002, dated Oct. 26, 2017, 5 pages.

* cited by examiner

*Primary Examiner* — Nathan M Nutter
(74) *Attorney, Agent, or Firm* — Julie Lapos-Kuchar

(57) ABSTRACT

Described herein is a pressure sensitive adhesive comprising a high molecular weight fluorinated polymer having a Tg less than about 0° C. and a number average molecular weight greater than about 20 kilograms/mole; and a low molecular weight fluorinated polymer derived from an ethylenically unsaturated fluorinated monomer, wherein the low molecular weight fluorinated polymer has a Tg greater than about −15° C. and a number average molecular weight less than about 18 kilograms/mole. Also described herein are articles comprising the pressure sensitive adhesive composition.

19 Claims, No Drawings

FLUORINATED PRESSURE SENSITIVE ADHESIVES AND ARTICLES THEREOF

CROSS REFERENCE TO RELATED APPLICATIONS

This application is a national stage filing under 35 U.S.C. 371 of PCT/US2017/046002, filed Aug. 9, 2017, which claims the benefit of U.S. Application No. 62/372827, filed Aug. 10, 2016, the disclosure of which is incorporated by reference in its/their entirety herein.

TECHNICAL FIELD

A fluorinated pressure sensitive adhesive is described along with articles comprising the aforementioned pressure sensitive adhesive.

SUMMARY

There is a desire to identify alternative pressure sensitive adhesives (PSA). In one embodiment, there is a desire to identify pressure sensitive adhesives that have sufficient adherence to low surface energy substrates such a polyalkylenes, and fluorine-containing surfaces. In one embodiment, there is a desire to identify pressure sensitive adhesives that have improved chemical resistance. In one embodiment, there is a desire to identify pressure sensitive adhesives that have good oil resistance.

In one aspect, a pressure sensitive adhesive is described comprising:
 (a) a high molecular weight fluorinated polymer having at least one Tg less than about 0° C. and a number average molecular weight greater than about 20 kilogram/mole; and
 (b) a low molecular weight fluorinated polymer derived from an ethylenically unsaturated fluorinated monomer, having a Tg greater than about −15° C. and a number average molecular weight less than about 18 kilogram/mole.

In another aspect, a multilayered article is described comprising a pressure sensitive adhesive, wherein the pressure sensitive adhesive comprises:
 (a) a high molecular weight fluorinated polymer having at least one Tg less than about 0° C. and a number average molecular weight greater than about 20 kilogram/mole; and
 (b) a fluorinated low molecular weight fluorinated polymer derived from an ethylenically unsaturated fluorinated monomer and having a Tg greater than about −15° C. and a number average molecular weight less than about 18 kilogram/mole.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term
 "a", "an", and "the" are used interchangeably and mean one or more; and
 "and/or" is used to indicate one or both stated cases may occur, for example A and/or B includes, (A and B) and (A or B);
 "backbone" refers to the main continuous chain of a polymer;
 "copolymer" refers to a polymer derived from two or more different monomers and includes terpolymers, quadpolymers, etc.;
 "crosslinking" refers to connecting two pre-formed polymer chains using chemical bonds or chemical groups in order to increase the modulus of the material;
 "interpolymerized" refers to monomers that are polymerized together to form the backbone of the polymer;
 "(meth)acrylate" refers to compounds containing either an acrylate ($CH_2$=CHCOOR) or a methacrylate ($CH_2$=$CCH_3$COOR) structure or combinations thereof;
 "monomer" is a molecule which can undergo polymerization which then form part of the essential structure of a polymer;
 "perfluorinated" means a group or a compound derived from a hydrocarbon wherein all hydrogen atoms have been replaced by fluorine atoms. A perfluorinated compound may however still contain other atoms than fluorine and carbon atoms, like oxygen atoms, nitrogen atoms, sulfur atoms, chlorine atoms, bromine atoms and iodine atoms.

The term "polymer" as used herein refers to a molecule comprising a chain having at least four interpolymerized monomeric units.

The term "alkyl" refers to a monovalent group that is a radical of an alkane, which is a saturated hydrocarbon. The alkyl can be linear, branched, cyclic, or combinations thereof and typically has 1 to 50 carbon atoms. In some embodiments, the alkyl group contains at least 1, 2, 3, 4, 5, 6, 8, or 10 carbon atoms; at most 50, 40, 30, 28, 26, 25, 20, or 15 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "alkylene" refers to a divalent group that is a radical of an alkane. The alkylene can be straight-chained, branched, cyclic, or combinations thereof. The alkylene often has 1 to 50 carbon atoms. In some embodiments, the alkylene group contains at least 1, 2, 3, 4, 5, 6, 8, 10, 15, 20, or 25 carbon atoms; at most 50, 40, 30, 28, 26, 25, 20, 15, 10, 8, 6, 5, 4, or 3 carbon atoms. The radical centers of the alkylene can be on the same carbon atom (i.e., an alkylidene) or on different carbon atoms.

The term "arylene" refers to a divalent group that is a radical of an arene that has typically, 4, 5, or 6 carbon atoms.

The term "aryl alkylene" refers to a divalent group that comprises both an aromatic group and an alkane group.

The term "aryl" refers to a monovalent group that is aromatic and carbocyclic or heterocyclic. The aryl can have one to five rings that are connected to or fused to the aromatic ring. The other ring structures can be aromatic, non-aromatic, or combinations thereof and typically has 1 to 30 carbon atoms. In some embodiments, the aryl group contains at least 3, 4, 5, 6, 8, 10, 15, 20, or 25 carbon atoms; at most 30, 28, 26, 25, 20, 15, or 10 carbon atoms. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "alkylaryl" refers to a monovalent group that is a combination of an alkyl and an aryl group. The alkylaryl can be an aralkyl, that is, an alkyl substituted with an aryl, or alkaryl, that is, an aryl substituted with an alkyl. The alkylaryl can have one to five rings that are connected to or fused to the aromatic ring and can comprise linear, branched, or cyclic segments, or combinations thereof. The alkylaryl group typically has 4 to 30 carbon atoms. In some embodiments, the alkylaryl group contains at least 4, 5, 6, 8, 10, 15, 20, or 25 carbon atoms; at most 50, 40, 30, 28, 26, 25, 20, 15, or 10 carbon atoms.

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

Pressure sensitive adhesives are a type of polymeric composition useful to adhere together two adherends. Pressure sensitive adhesive compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength. Materials that have been found to function well as pressure sensitive adhesives are polymers designed and formulated to exhibit the requisite viscoelastic properties resulting in a desired balance of tack, peel adhesion, and shear holding power.

Conventional pressure sensitive adhesives (PSAs) such as, for example, non-fluorinated acrylate-based adhesives are typically designed for adhesion to either substrates having high surface energy, such as, for example, stainless steel or to substrates having low surface energy, such as, for example, polyolefins. These conventional pressure sensitive adhesives do not adhere well to fluorinated substrates. Fluorinated surfaces are popular due to their inert nature which can, for example, (i) prevent food from sticking to a cooking pan, (ii) prevent stains from adhering to cloth or a digital display surface, or (iii) provide water and oil repellency to porous surfaces.

There is a continuous need for pressure sensitive adhesives that are applicable to a broad range of substrates, including substrates having high and low surface energy. In particular, it is desirable to provide pressure sensitive adhesives that adhere well to fluorine-containing surfaces. In addition or alternatively, in many applications, it is desirable that the pressure sensitive adhesives retain their adhesive properties under harsh conditions (such as chemical resistance, oil resistance, etc.).

The present disclosure is directed toward the use of a pressure sensitive adhesive comprising fluorinated materials, specially a high molecular weight fluorinated polymer and a low molecular weight fluorinated polymer.

High Molecular Weight Fluorinated Polymer

The high molecular weight fluorinated polymer is a polymer having at least one glass transition temperature (Tg) less than about 0, −5, −10, −20, −30, −40, −50, −60, or even −70° C. In one embodiment, the high molecular weight fluorinated polymer has one Tg. Unless otherwise mentioned, the Tg values of the materials disclosed herein are measured by DSC (differential scanning calorimetry) following methods known in the art, for example, ASTM D7426: Standard Test Method for Assignment of the DSC Procedure for Determining Tg of a Polymer or an Elastomeric Compound (D7426-08, reapproved 2013).

The high molecular weight fluorinated polymer may be derived from one or more fluorinated monomer(s) such as fluorinated olefins, fluorinated vinyl ethers, and fluorinated allyl ethers. Exemplary fluorinated monomers include: tetrafluoroethylene (TFE), vinyl fluoride (VF), vinylidene fluoride (VDF), hexafluoropropylene (HFP), pentafluoropropylene, trifluoroethylene, trifluorochloroethylene (CTFE), $CF_3CF=CH_2$, perfluoro ether monomer, and combinations thereof.

Such fluoro ether monomers include those of the Formula (I)

$$CF_2=CF(CF_2)_bO(R_{f'}O)_n(R_{f'}O)_mR_f \qquad (I)$$

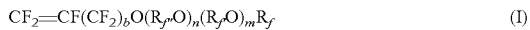

where $R_{f'}$ and $R_{f'}$ are independently linear or branched fluoroalkylene groups comprising 2, 3, 4, 5, or 6 carbon atoms, b is 0 or 1, m and n are independently an integer selected from 0, 1, 2, 3, 4, 5, 6, 7, 8, 9, and 10, and $R_f$ is a fluoroalkyl group comprising 1, 2, 3, 4, 5, or 6 carbon atoms. Exemplary perfluorinated vinyl ether monomers include: perfluoro (methyl vinyl) ether (PMVE), perfluoro (ethyl vinyl) ether (PEVE), perfluoro (n-propyl vinyl) ether (PPVE-1), perfluoro-2-propoxypropylvinyl ether (PPVE-2), perfluoro-3-methoxy-n-propylvinyl ether, perfluoro-2-methoxy-ethylvinyl ether, perfluoro-methoxy-methylvinylether ($CF_3-O-CF_2-O-CF=CF_2$), and $CF_3-(CF_2)_2-O-CF(CF_3)-CF_2-O-CF(CF_3)-CF_2-O-CF=CF_2$, perfluoro (methyl allyl) ether ($CF_2=CF-CF_2-O-CF_3$), perfluoro (ethyl allyl) ether, perfluoro (n-propyl allyl) ether, perfluoro-2-propoxypropyl allyl ether, perfluoro-3-methoxy-n-propylallyl ether, perfluoro-2-methoxy-ethyl allyl ether, perfluoro-methoxy-methyl allyl ether, and $CF_3-(CF_2)_2-O-CF(CF_3)-CF_2-O-CF(CF_3)-CF_2-O-CF_2CF=CF_2$, $CF_2=CFOCF_2OCF_2CF_3$, $CF_2=CFOCF_2OC_3F_7$, and combinations thereof.

Partially fluorinated ether monomers include those of Formula (II);

$$CXX=CX(CYY)_bO(R_{f'}O)_n(R_{f'}O)_mR_f \qquad (II)$$

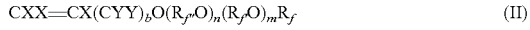

where X is independently selected from H or F; Y is independently selected from H, F, or $CF_3$; $R_{f'}$ and $R_{f'}$ are independently linear or branched fluoroalkylene groups comprising 2, 3, 4, 5, or 6 carbon atoms, b is 0 or 1, m and n are independently an integer selected from 0, 1, 2, 3, 4, 5, 6, 7, 8, 9, and 10, and $R_f$ is a fluoroalkyl group comprising 1, 2, 3, 4, 5, or 6 carbon atoms.

Exemplary partially fluorinated ether monomers include for example: $CF_3-O-CH=CF_2$, $CF_3-O-CF=CFH$, $CF_3-O-CH=CH_2$, $CF_3-O-CF_2-CF=CH_2$, $CF_3-O-CF_2-CH=CH_2$, $CF_3-CH_2-O-CF_2-CF=CF_2$, $HCF_2-CH_2-O-CF_2-CF=CF_2$, $HCF_2-CF_2-CF_2-O-CF=CF_2$, $HCF_2-CF_2-CF_2-O-CF=CF_2$, $CF_3-CFH-CF_2-O-CF=CF_2$, and combinations thereof.

In one embodiment, additional monomers may be interpolymerized with the fluorinated monomers described above, including for example, non-fluorinated monomers, such as ethene, propene, and butene; other fluorinated monomers; and cure site monomers. Generally, these additional monomers would be used at less than 20, 10, 5, or even 2 mole percent in the fluoropolymer.

Exemplary fluoropolymers include: a TFE/propylene copolymer, a TFE/propylene/VDF copolymer, a VDF/HFP copolymer, a TFE/VDF/HFP copolymer, a TFE/PMVE copolymer, a TFE/$CF_2=CFOC_3F_7$ copolymer, a TFE/$CF_2=CFOCF_3$/$CF_2=CFOC_3F_7$copolymer, a TFE/ethyl vinyl ether (EVE) copolymer, a TFE/butyl vinyl ether (BVE) copolymer, a TFE/EVE/BVE copolymer, a VDF/$CF_2=CFOC_3F_7$ copolymer, an ethylene/HFP copolymer, a TFE/HFP copolymer, a CTFE/VDF copolymer, a TFE/VDF copolymer, a TFE/ethylene/PMVE-copolymer, a TFE/VDF/PMVE/ethylene copolymer, and a TFE/VDF/$CF_2=CFO(CF_2)_3OCF_3$ copolymer.

Cure site monomers are polymerized into the polymer and introduce cure sites into the fluorinated polymers for subsequent crosslinking reactions.

Exemplary halogenated cure site monomers may be represented by one or more compounds of the formula: $CX_2=CX(Z)$, wherein: (i) X each is independently H or F; and (ii) Z is I, Br, $R_f$—U wherein U=I or Br and $R_f$=a perfluorinated or partially perfluorinated alkylene group optionally containing catenated oxygen atoms. In addition, non-fluorinated bromo- or iodo-olefins, e.g., vinyl iodide and allyl iodide, can be used. In some embodiments, the cure site monomers are one or more compounds selected from the group consisting of $CH_2$=CHI, $CF_2$=CHI, $CF_2$=CFI, $CH_2$=CHCH$_2$I, $CF_2$=CFCF$_2$I, $CH_2$=CHCF$_2$CF$_2$I, $CF_2$=CFCH$_2$CH$_2$I, $CF_2$=CFCF$_2$CF$_2$I, $CH_2$=CH(CF$_2$)$_6$CH$_2$CH$_2$I, $CF_2$=CFOCF$_2$CF$_2$I, $CF_2$=CFOCF$_2$CF$_2$CF$_2$I, $CF_2$=CFOCF$_2$CF$_2$CH$_2$I, $CF_2$=CFCF$_2$OCH$_2$CH$_2$I, $CF_2$=CFO(CF$_2$)$_3$—OCF$_2$CF$_2$I, $CH_2$=CHBr, $CF_2$=CHBr, $CF_2$=CFBr, $CH_2$=CHCH$_2$Br, $CF_2$=CFCF$_2$Br, $CH_2$=CHCF$_2$CF$_2$Br, $CF_2$=CFOCF$_2$CF$_2$Br, $CF_2$=CFCl, $CF_2$=CFCF$_2$Cl, and a combination thereof.

Exemplary nitrile-containing cure site monomers include perfluoro(8-cyano-5-methyl-3,6-dioxa-1-octene); $CF_2$=CFO(CF$_2$)$_L$CN wherein L is an integer from 2 to 12; $CF_2$=CFO(CF$_2$)$_u$OCF(CF$_3$)CN wherein u is an integer from 2 to 6; $CF_2$=CFO[CF$_2$CF(CF$_3$)O]$_q$(CF$_2$O)$_y$CF(CF$_3$)CN wherein q is an integer from 0 to 4 and y is an integer from 0 to 6; or $CF_2$=CF[OCF$_2$CF(CF$_3$)]$_r$O (CF$_2$)$_t$CN wherein r is 1 or 2, and t is an integer from 1 to 4; and derivatives and combinations of the foregoing.

Exemplary hydroxy-containing cure site monomers may be represented by the formula: $CXX=CX(CXX)_q$—(O)$_n$—(CXX)$_m$—(O)$_p$—(CHZ)$_s$—(CYY)$_r$—CH$_2$OH wherein each X is independently selected from H or F; q is 0 or 1; n is 0 or 1; Z is either a OH, a C1-C5 alkyl group comprising a hydroxyl group, or a C1-C5 fluorinated alkyl group comprising a hydroxyl group; each Y is independently selected from H, F, an alkyl group, or a fluorinated alkyl group; m is an integer from 0-10; p is 0 or 1; s is an integer from 0-2; and r is an integer from 0-10. Exemplary fluorinated hydroxy-containing cure site monomers include: $CF_2$=CF—O—(CF$_2$)$_t$—CH$_2$OH and $CF_2$=CF—CF$_2$—O—(CF$_2$)$_t$—CH$_2$OH where t is an integer from 1-5. Exemplary nonfluorinated hydroxy-containing cure site monomers include: $CH_2$=CH—O—(CH$_2$)$_v$—OH, $CH_2$=CH—CH$_2$—O—(CH$_2$)$_v$—OH, and $CH_2$=CH—(CH$_2$)$_v$—OH, where v is an integer from 1-6.

Exemplary acid- or ester-containing cure site monomers may be represented by the formula $CXX=CX(CXX)_q$—(O)$_n$—(CXY)$_m$—(O)$_p$—(CXQ)$_s$-(CYY)$_r$-Q wherein each X is independently selected from H or F; each Y is independently selected from H, F, an alkyl group, or a fluorinated alkyl group; q is 0 or 1; n is 0 or 1; m is an integer from 0-10; p is 0 or 1; s is an integer from 0-2; r is an integer from 0-10; and Q is selected from COO$^{-1}$, COOR, wherein R is a linear or branched alkyl group comprising 1 to 5 carbons, SO$_2$F, SO$_3^{-1}$, and SO$_2$NH$_2$, an alkyl group comprising COO$^{-1}$, COOR, SO$_2$F, SO$_3^{-1}$, or SO$_2$NH$_2$, or a fluorinated group alkyl group comprising COO$^{-1}$, COOR, SO$_2$F, SO$_3^{-1}$, or SO$_2$NH$_2$ as previously described. Exemplary monomers include $CF_2$=CF—[O—CF(CF$_3$)CF$_2$]$_b$—O—(CF$_2$)$_c$-Q where b is 0 or 1 and c is an integer of 1-10; $CF_2$=CF—CF$_2$—[O—CF(CF$_3$)CF$_2$]$_d$—O—(CF$_2$)$_c$-Q where d is an integer from 0-2 and c is an integer of 1-10; $CH_2$=CH—COOH; $CH_2$=CH—COOR where R is defined above; $CH_2$=CH—O—(CH$_2$)$_c$—COOH where c is defined above; $CH_2$=CH—O—(CH$_2$)$_c$—COOR where c and R are defined above; $CH_2$=CH—O—(CH$_2$)$_c$—SO$_3$H where c is defined above; $CH_2$=CH—O—(CH$_2$)$_c$—SO$_2$NH$_2$ where c is defined above; $CH_2$=CH—CH$_2$—O—(CH$_2$)$_c$—COOH where c is defined above; $CH_2$=CH—CH$_2$—O—(CH$_2$)$_c$—COOR where c and R are defined above; $CH_2$=CH—CH$_2$—O—(CH$_2$)$_c$—SO$_3$H where c is defined above; $CH_2$=CH—CH$_2$—O—(CH$_2$)$_c$—SO$_2$NH$_2$ where c is defined above; and $CH_2$=CH—O—C$_6$H$_4$-Q where Q is defined above.

Exemplary olefinic cure site monomers may be represented by the formula: $CXX=CX(CXX)_q$—(O)$_n$—(CXY)$_m$—(O)$_p$—(CXX)$_s$—(CXX)$_r$—CX=CXX wherein each X is independently selected from H or F; q is 0 or 1; n is 0 or 1; m is an integer from 0-10; p is 0 or 1; s is an integer from 0-2; and r is an integer from 0-10. Exemplary monomers include $CF_2$=CF—O—(CF$_2$)$_a$—O—CF=CF$_2$, $CF_2$=CF—CF$_2$—O—(CF$_2$)$_a$—O—CF$_2$—CF=CF$_2$, $CF_2$=CF—O—(CF$_2$)$_a$—CH=CH$_2$, $CH_2$=CH—(CF$_2$)$_a$—CH=CH$_2$, $CF_2$=CF—O—(CF$_2$)$_a$—O—CF$_2$—CF=CF$_2$, $CH_2$=CH—O—(CH$_2$)$_a$—CH=CH$_2$, and $CH_2$=CH—O—(CH$_2$)$_a$—O—CH=CH$_2$ where a is an integer from 1-10.

Exemplary amine and azide cure site monomers may be represented by the formula $CXX=CX(CXX)_q$—(O)$_n$—(CXY)$_m$—(O)$_p$—(CXZ')$_s$—(CYY)$_r$—Z' wherein each X is independently selected from H or F; each Y is independently selected from H, F, an alkyl group, or a fluorinated alkyl group; q is 0 or 1; n is 0 or 1; m is an integer from 0-10; p is 0 or 1; s is an integer from 0-2; r is an integer from 0-10; and Z' is selected from an amine or an azide. Exemplary monomers include: $CH_2$=CH—O—(CH$_2$)$_a$—NH$_2$, $CH_2$=CH—CH$_2$—O—(CH$_2$)$_a$—NH$_2$, $CH_2$=CH—(CH$_2$)$_a$—NH$_2$, $CH_2$=CH—O—C$_6$H$_4$—NH$_2$, $CF_2$=CF—O—(CF$_2$)$_a$—(CH$_2$)$_c$NH$_2$, $CF_2$=CF—CF$_2$—O—(CF$_2$)$_a$—(CH$_2$)$_c$—NH$_2$, $CF_2$=CF$_2$—O—(CF—CF$_2$)$_b$—(CF$_2$)$_a$—(CH$_2$)$_c$—NH$_2$, $CH_2$=CH—O—(CH$_2$)$_a$—N$_3$, $CH_2$=CH—CH$_2$—O—(CH$_2$)$_a$—N$_3$, $CH_2$=CH—(CH$_2$)$_a$—N$_3$, $CH_2$=CH—O—C$_6$H$_4$—N$_3$, $CF_2$=CF—O—(CF$_2$)$_a$—N$_3$, $CF_2$=CF—O—(CF$_2$)$_a$—(CH$_2$)$_c$—N$_3$, $CF_2$=CF—CF$_2$—O—(CF$_2$)$_a$—N$_3$, $CF_2$=CF—CF$_2$—O—(CF$_2$)$_a$—(CH$_2$)$_c$—N$_3$, and $CF_2$=CF—O—(CF(CF$_3$)—CF$_2$)$_b$—O—(CF$_2$)$_a$—CH$_2$)$_d$—N$_3$, where a is an integer from 1-6, b is an integer from 0-2, c is an integer from 1-4, and d is an integer from 0-4.

If crosslinking of the fluoropolymer is desired, the fluoropolymer may contain a sufficient quantity of cure-site groups which can act as cure sites for crosslinking reactions. Typically, the fluoropolymer comprises from at least about 0.05, 0.1, or even 0.5 mole percent and no more than about 10, 5 or even 2 mole cure site monomer versus the total fluoropolymer.

Chain transfer agents may be added during the polymerization to control the molecular weight and optionally introduce cures sites into the fluorinated polymer. Chain transfer agents may include for example, alkanes such as ethane and n-pentane, dialkyl ethers such as dimethyl ether, methyl tertiary butyl ether, thiols, or compounds having the formula $R_fY_x$, wherein $R_f$ is an x-valent (per) fluoroalkyl radical C1-C12, optionally containing chlorine atoms, while x is 1 or 2, and Y represents Br, Cl or I. Examples include perfluoroalkyl-chloride, bromide or iodides. Examples of suitable chain transfer agents include $CF_2Br_2$, Br(CF$_2$)$_2$Br, Br(CF$_2$)$_4$Br, CF$_2$ClBr, CF$_3$CFBrCF$_2$Br and the like. Further examples of suitable chain transfer agents include CH$_2$Br$_2$ and those disclosed in U.S. Pat. No. 4,000,356. Other suitable chain transfer agents are iodine containing chain transfer agents such as CH$_2$I$_2$, CF$_2$I$_2$, ICF$_2$CF$_2$CF$_2$CF$_2$I, CF$_3$I, CH$_3$I and the like. If the chain transfer agent comprises I or Br, these atoms may be incorporated into the fluoropolymer, which can act as cure-sites as well. For example, suitable iodo-chain transfer agent in the polymerization include the formula of $RI_x$, where (i) R is a perfluoroalkyl or chloroperfluoroalkyl group having 3 to 12 carbon atoms; and (ii) x is 1 or 2. The iodo-chain transfer agent may be a perfluorinated iodo-compound. Exemplary iodo-perfluoro-compounds include 1,3-diiodoperfluoropropane, 1,4-diiodoperfluorobutane, 1,6-diiodoperfluorohexane, 1,8-diiodoperfluorooctane, 1,10-diiodoperfluorodecane, 1,12-diiodoperfluorododecane, 2-iodo-1,2-dichloro-1,1,2-trifluoroethane, 4-iodo-1,2,4-trichloroperfluorobutan, and mixtures thereof. In some embodiments, the bromine is derived from a brominated chain transfer agent of the formula: $RBr_x$, where (i) R is a perfluoroalkyl or chloroperfluoroalkyl group having 3 to 12 carbon atoms; and (ii) x=1 or 2. The chain transfer agent may be a perfluorinated bromo-compound.

Exemplary commercially available high molecular weight fluorinated polymers include those available under the trade designations: "3M DYNEON FLUOROELASTOMER FC 1610N", "3M DYNEON FLUOROELASTOMER FPO 3520", "3M DYNEON FLUOROELASTOMER FPO 3630", "3M DYNEON FLUOROELASTOMER FC 2178", and "3M DYNEON FLUOROELASTOMER LTFE 6350Z" available from 3M Company, St. Paul, Minn.; "VITON A100", "VITON A200", and "VITON A500" available from The Chemours Co., Wilmington, Del.; and "DAI-EL G-211" available from Diakin Industries LTD., Osaka, Japan; and "TECNOFLON N 215U", "TECNOFLON N 535", and "TECNOFLON N 935" available from Solvay S.A., Brussels, Belgium.

The fluorinated polymers can be prepared by polymerization of appropriate fluorinated monomer mixtures in the presence of a free radical generating initiator either in bulk, in solution in a solvent (such as a tertiary butanol solvent or halogenated solvents such as fluorinated solvents e.g., sold under the trade name "3M FLUORINERT ELECTRONIC LIQUID" and "3M NOVEC ENGINEERED FLUID from 3M Co., St. Paul, Minn.), in aqueous suspension, or in aqueous emulsion. Such polymerization techniques are known in the art. In one embodiment the polymerizations are carried out in an aqueous medium by feeding monomers under pressure into a stirred reactor and initiating the polymerization. The polymerization systems may comprise auxiliaries, such as buffers and, if desired, complex-formers or chain-transfer agents.

Initiator systems that may be used to initiate the free radical polymerization include initiator systems that generate free radicals through a redox reaction such as for example a combination of an oxidizing agent and a reducing agent (e.g., a perfluoroalkyl sulfinate and a suitable oxidizing agent capable of oxidizing the perfluoroalkyl sulfinate to a perfluoroalkyl sulfonyl radical, which subsequently generates a perfluoroalkyl radical). Suitable oxidizing agents for this purpose include persulfates, including for example, ammonium persulfate, potassium persulfate, and sodium persulfate. Other oxidizing agents such as bromate, chlorate and hypochlorite, as described in U.S. Pat. No. 5,639,837 (Farnham et al.), may also be used. A particularly useful class of reducing agents are perfluoroalkyl sulfinates, but other reducing agents may also be present, such as a sulfite, e.g., sodium sulfite, sodium bisulfite; a metabisulfite, e.g., sodium or potassium bisulfite; pyrosulfites; and thiosulfates. Additionally, $Na_2S_2O_5$, and metal ions such as copper, iron, and silver may be used. The amount of initiator employed is typically between 0.03% and 2% by weight, preferably between 0.05% and 1% by weight based on the total weight of the polymerization mixture.

In one embodiment, at least 10%, 20%, 30%, 40%, 50%, 60%, or even 70% of all of the C—H and C—F bonds in the fluorinated polymer are C—F bonds. The fluorinated polymer may be partially fluorinated (i.e., comprising C—F and C—H bonds) or highly fluorinated, wherein the backbone of the fluoropolymer comprise C—F bonds and no C—H bonds, however the terminal groups, where the polymerization reaction initiates and terminates may comprise C—H bonds as a result of the initiator and/or chain transfer agent used in the polymerization reaction.

In one embodiment of the present disclosure, the fluoropolymer is an amorphous polymer which may or may not be crosslinked. In one embodiment, crosslinking may be used to improve the thermal shear strength of the PSA. The crosslinking agent used to crosslink the polymer would depend on the cure-site present. For example, when comprising a nitrile or halogen, crosslinking of the amorphous polymer to generate a fluoroelastomer can be performed generally with a peroxide, a silyl, a polyol or a polyamine, or an appropriate catalyst. When the cure-site comprises an azide, a crosslinking agent comprising an alkyne can be used. When the cure-site comprises an alcohol, an (iso) cyanate-, acid-, ester-, or olefin-containing crosslinking system can be used. When the cure-site comprises a vinyl group, a cure system comprising polyalcohols, polyamines, or alcohol containing amines can be used. When the cure-site comprises a nitrile, a curing system comprising azides, amines, including polyamines, aminophenols and aminoalcohols, or ammonia generating compounds can be used. When the cure site comprises an ester, curing systems comprising polyalcohols or polyamines are suitable. Such cure systems are known in the art.

An amorphous fluoropolymer has an absence of long-range order, wherein long-range order means that the arrangement and orientation of the macromolecules beyond their nearest neighbors is understood. Typically, an amorphous fluoropolymer has no detectable crystalline character by differential scanning calorimetry (DSC). In other words, the amorphous fluoropolymer would have no melting point or melt transitions with an enthalpy more than 2 milli-Joules/g by DSC.

In another embodiment of the present disclosure, the fluoropolymer is a fluoro-thermoplastic elastomer, comprising hard segments and soft segments, such as those disclosed in U.S. Pat. Publ. No. 2015/0240134 (Keite-Telgenbuscher, et al.) and EP 0399543 (Tatemoto). Such fluoropolymers include a fluorine-containing elastomer having at least one soft segment, composed of a terpolymer of vinylidene fluoride/hexafluoropropylene/tetrafluoroethylene or vinylidene fluoride/chlorotrifluoroethylene/tetrafluoroethylene, and at least one hard segment, composed of a copolymer of tetrafluoroethylene/ethylene or chlorotrifluoroethylene/ethylene or polyvinylidene fluoride; a fluorine-containing elastomer having at least one soft segment composed of a copolymer of tetrafluoroethylene/propylene and at least one hard segment composed of a copolymer of tetrafluoroethylene/ethylene; and/or a fluorine-containing elastomer having at least one soft segment composed of an amorphous rubberlike copolymer of tetrafluoroethylene/perfluoroalkyl vinyl ether and at least one hard segment composed of a copolymer of tetrafluoroethylene/perfluoroalkyl vinyl ether in which the amount of perfluoroalkyl vinyl ether is less than in the soft segment. Such commercially available fluoropolymers include those under the trade designation "DAI-EL THERMOPLASTIC T-500" series, such as T-530 and T-550 and "DAI-EL G-7000" series, such as G-7400EBP and G-7400BP from Daikin Industries Ltd., Osaka, Japan.

In one embodiment, the high molecular weight fluoropolymer has a number average molecular weight (Mn) of at least 20; 25; 40; 50; 100; 300; 500; 750; 1000; or even 1500 kilograms/mole using techniques known in the art such as gel permeation chromatography.

Low Molecular Weight Fluorinated Polymer

The low molecular weight fluorinated polymer of the present disclosure is a fluorinated polymer preferably having a higher glass transition temperature than the high molecular weight fluoropolymer and, which is used to increase the tack (or stickiness) of the pressure sensitive adhesive.

The low molecular weight fluorinated polymer of the present disclosure has a Tg greater than about −20, −15, −10, −5, 0, or even 10° C.; and at most 100, 80, 60, 50, 40, 35, or even 30° C.

The low molecular weight fluorinated polymer of the present disclosure is derived from the polymerization of an ethylenically unsaturated fluorinated monomer. The fluorinated monomer may be partially fluorinated (comprising at least one C—H bond and at least one C—F bond) or perfluorinated (comprising no C—H bonds and at least one C—F bond).

In one embodiment, the backbone of the low molecular weight fluorinated polymer comprises at least 4, or even 5 interpolymerized monomeric units and at most 25, 30, 40, or even 50 interpolymerized monomeric units.

In one embodiment, the low molecular weight fluorinated polymer has a number average molecular weight (Mn) of at least 0.5, 1, or even 2 kilograms/mole and at most 5, 8, 10, 15, or even 18 kilograms/mole. The number average molecular weight may be determined by using gel permeation chromatography, as is known in the art.

The low molecular weight fluorinated polymer disclosed herein is fluorinated, meaning that some of the C—H bonds in the polymer are replaced with C—F bonds. In one embodiment, at least 10%, 20%, 30%, 40%, 50%, 60%, or even 70% of all of the C—H bonds in the low molecular weight fluorinated polymer are replaced by C—F bonds. The fluorinated low molecular weight fluorinated polymer may be partially fluorinated (i.e., wherein the backbone and/or pendent groups of the polymer comprise at least one C—F bond and at least one C—H bond) or highly fluorinated, wherein the backbone and pendent groups of the polymer comprise C—F bonds and no C—H bonds, however the terminal groups, where the polymerization reaction initiates or terminates may comprise C—H bonds as a result of the initiator and/or chain transfer agent used in the polymerization reaction.

In one embodiment, the low molecular weight fluorinated polymer is derived from a (meth)acrylate monomer, a vinyl monomer, a styrene monomer, and combinations thereof.

In one embodiment, the low molecular weight fluorinated polymer of the present disclosure is derived from a (meth)acrylate monomer. In one embodiment, the (meth)acrylate monomer comprises a fluoroalkyl group, wherein the fluoroalkyl group comprises from 1 to 10 carbon atoms, 3 to 10 carbon atoms, or even 3 to 8 carbon atoms. Exemplary fluorinated (meth)acrylate monomers include: trifluoromethyl (meth) acrylate, pentafluoroethyl (meth) acrylate, heptafluoro propyl (meth) acrylate, nonafluoro butyl (meth) acrylate, undecafluoropentyl (meth) acrylate, tridecafluorohexyl (meth) acrylate, pentadecafluoroheptyl (meth) acrylate, and (meth) acryloyl monomers. In one embodiment, the (meth) acryloyl monomers are of the general formula (III):

$$CH_2=C(R^1)-COO-(CH_2)_m-(CF_2)_n-Z \quad \quad (III)$$

where $R^1$ is a hydrogen atom or a methyl group; Z is a hydrogen atom or a fluorine atom; n is an integer of 1, 2, 3, 4, 5, 6, 7, 8, 9, or 10; and m is an integer of 0, 1, 2, 3, or 4.

Since there is a tendency for glass transition temperature to become high, also among these, the methacrylate type is more preferable than an acrylate type.

In one embodiment, the low molecular weight fluorinated polymer comprises an interpolymerized segment according to formula (IV):

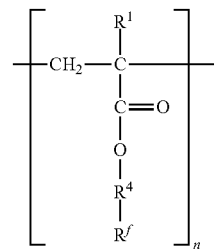

wherein $R^1$ is H or $CH_3$; $R^4$ is a linking group; $R_f$ comprises a fluorinated alkyl group; and n is at least 2. $R^4$ in Formula IV is a linking group, linking the ester from the (meth)acryl group with the fluorinated alkyl group. In one embodiment, $R^4$ comprises at least one of an alkylene, a carbamate group, an ether group, an ester group, a urea group, and combinations thereof. The carbamate, ether, ester, and urea group may further comprise an alkylene, arylene, or aryl alkylene. Exemplary $R^4$ groups include: $-CH_2-$; $-C_2H_4-$; $-C_3H_6-$; $-C_4H_8-$; $-C_2H_4OC(=O)NH-(C_6H_4)-CH_2-(C_6H_4)CH_2CO_2C_2H_4-$; $-C_2H_4OC(=O)NH-(C_6H_3CH_3)-NHCO_2C_2H_4-$; $C_2H_4NHCO_2C_2H_4-$; $-(C_2H_4O)_v$ wherein v is 1-5; and $-C_2H_4NHC(=O)-$.

In one embodiment, $R^f$ of formula IV is a C1-C10 fluorinated alkyl group, optionally comprising at least one catenated heteroatom such as O, N, or S. In one embodiment, $R^f$ is perfluorinated.

In one embodiment, the low molecular weight fluorinated polymer is a low molecular weight fluorinated (meth)acrylate polymer that comprises pendent sulfonylamide groups (i.e., $-S(=O)_2-N(R)-$), which extend from the backbone. In one embodiment, the low molecular weight fluorinated (meth)acrylate polymer comprises a plurality of pendent sulfonylamide groups, in other words comprises at least 2, 3, 5 or even 10 pendent; and at most 25, 30, 40, or even 50 sulfonylamide groups per polymer.

In one embodiment, the low molecular weight fluorinated (meth)acrylate polymer comprises an interpolymerized segment according to formula (V):

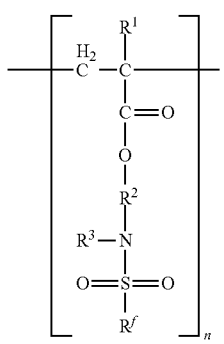

(V)

wherein $R^1$ is H or $CH_3$; $R^2$ is a linking group; $R^3$ is H or an alkyl group comprising 1 to 10 carbon atoms; $R^f$ comprises a fluorinated group, and n is at least 2.

$R^2$ in Formula V is a linking group, linking the ester from the (meth)acryl group with the sulfonylamide moiety. In one embodiment, $R_2$ comprises at least one of an alkylene, a carbamate group, an ether group, an ester group, a urea group, and combinations thereof. The carbamate, ether, ester, and urea group may further comprise an alkylene, arylene, or aryl alkylene. Exemplary $R_2$ groups include: —$CH_2$—; —$C_2H_4$—; —$C_3H_6$—; —$C_4H_8$—; —$C_2H_4O$—C(=O)NH—($C_6H_4$)—$CH_2$—($C_6H_4$)$CH_2CO_2C_2H_4$—; —$C_2H_4$—OC(=O)NH—($C_6H_3CH_3$)—$NHCO_2C_2H_4$—; —$C_2H_4NHCO_2C_2H_4$—; —($C_2H_4O$)$_v$— wherein v is 1-5; and —$C_2H_4NHC$(=O)—.

$R^f$ is a fluorinated alkyl or fluorinated aryl group, comprising 1 to 10 carbon atoms. $R^f$ may be partially fluorinated or perfluorinated (i.e., fully fluorinated). Exemplary $R^f$ groups include: —$CF_3$; —$C_2F_5$; —$C_3F_7$; —$C_4F_9$; —$C_5F_{11}$; —$C_6F_{13}$; —$C_8F_{17}$; —$C_9F_{19}$; and —$C_6F_5$.

In one embodiment, in addition to the interpolymerized monomers comprising a pendent sulfonylamide group, the low molecular weight fluorinated polymer may comprise additional monomeric units randomly polymerized into the low molecular weight polymer. These additional monomeric units may be incorporated into the low molecular weight fluorinated polymer to modify its properties.

Exemplary monomers include:

In one embodiment, the fluorinated olefins include those of the formula $CX^1X^2$=$CX^3Y$, where $X^1$, and $X^2$ are independently selected from H or F; $X^3$ is selected from H, F, an alkyl group, or a fluorinated alkyl group; and Y is selected from H, F, or an alkyl group, optionally comprising a functional group, such as an ether. In one embodiment, the fluorinated vinyl monomers are a fluorinated vinyl ethers as discussed above in the fluoropolymer section. Exemplary fluorinated vinyl monomers include: TFE, VF, VDF, HFP, pentafluoropropylene, trifluoroethylene, trifluorochloroethylene (CTFE), $CF_3CF$=$CH_2$, perfluoro ether monomer, and combinations thereof.

In one embodiment, the low molecular weight fluorinated polymer is a copolymer derived from at least vinylidene fluoride, hexafluoropropylene, and tetrafluoroethylene.

In one embodiment, the low molecular weight fluorinated polymer is a copolymer derived from a perfluorinated vinyl ether and additional monomers, preferably hydrocarbon monomers. These additional monomers may be incorporated into the low molecular weight fluorinated polymer to modify its properties. In one embodiment, the fluorinated vinyl ethers include those of the formula (VI):

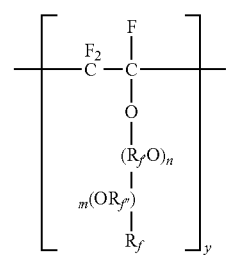

(VI)

wherein $R_{f''}$ and $R_{f'}$ are independently linear or branched fluoroalkylene radical groups comprising 2, 3, 4, 5, or 6 carbon atoms; m and n are independently an integer selected from 0, 1, 2, 3, 4, 5, 6, 7, 8, 9, and 10; $R_f$ is a fluoroalkyl group comprising 1, 2, 3, 4, 5, or 6 carbon atoms; and y is at least 1 compared to the total monomeric units in the low molecular weight fluorinated polymer.

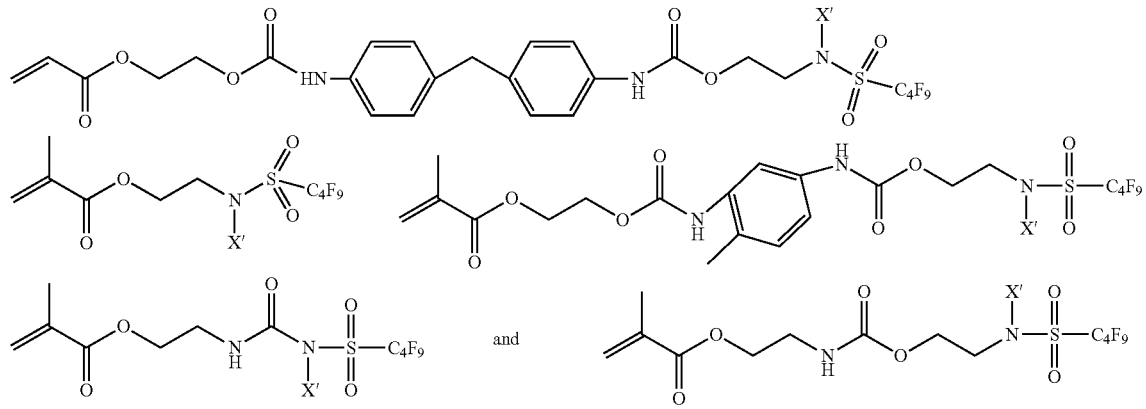

wherein X' is $CH_3$ or H.

In one embodiment, the low molecular weight fluorinated polymer is derived from fluorinated vinyl monomers such as fluorinated olefins, and fluorinated vinyl ethers.

Exemplary monomers used include $CF_2$=CF—O—$R_F$, $CF_2$=CF[—O—CF($CF_3$)—$CF_2$]$_z$—O—$R_F$; $CF_2$=CF—[O—($CF_2$)$_a$—]$_b$O—$R_F$, where $R_F$ is $CF_3$, $C_2F_5$, or $C_3F_7$, z is an integer from 1-3, a is an integer from 1-6, and b is an integer from 1-4; CH$_2$=CH—OC(=O)R where R is CH$_3$, C$_2$H$_5$, C$_3$H$_7$ or C(CH$_3$)R$^1$R$^2$ where R$^1$ and R$^2$ independently represent an alkyl group having at least one carbon atom; CH$_2$=CH—CH$_2$—OC(=O)R where R is CH$_3$, C$_2$H$_5$, or C$_3$H$_7$ or C(CH$_3$)R$^1$R$^2$ where R$^1$ and R$^2$ independently represent an alkyl group having at least one carbon atom.

Exemplary additional monomers include vinylesters, including vinyl acetate and vinyl benzoate, or vinylethers, including hydroxyl containing vinyl ether; CH$_2$=CH—(CH$_2$)$_o$—O—(CH$_2$)$_c$—OH, where o is 0 or 1 and c is 1 to 10; CH$_2$=CH—(CH$_2$)$_o$—O—(CH$_2$)$_c$—CN, where o is 0 or 1 and c is 1 to 10; CH$_2$=CH—C$_6$H$_5$; and CH$_2$=CH—C$_6$H$_4$OH.

Exemplary low molecular weight fluorinated polymer include those having the following repeat unit sequence:

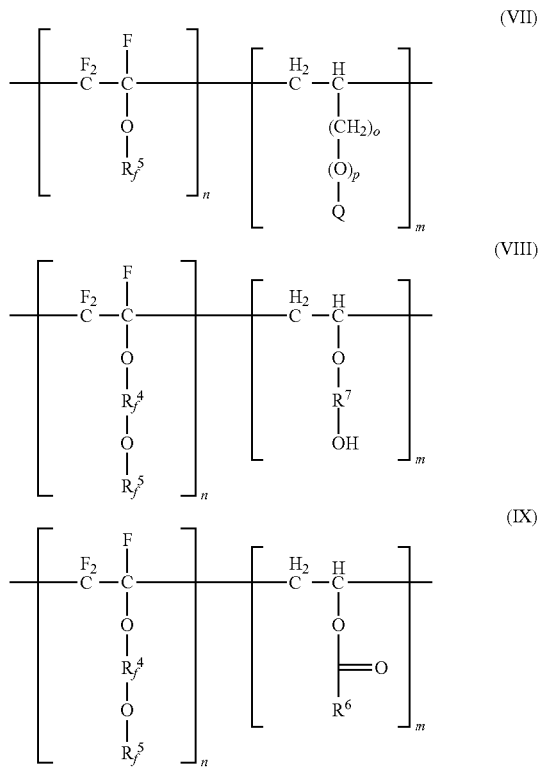

where R$_f^1$ and R$_f^2$ are independently selected from a linear or branched fluorinated alkylene group comprising from 1 to 6 carbon atoms; R$_f^4$ is a perfluorinated alkylene group comprising from 1 to 6 carbon atoms; R$_f^5$ is a perfluorinated alkyl group comprising 1 to 12 carbon atoms, which may optionally comprise at least one catentated oxygen atom; R$^6$ is a non-fluorinated alkyl, aryl, or alkylaryl comprising 1 to 12 carbon atoms; R$^7$ is a alkylene, arylene or alkylarylene group that may be substituted and comprising from 1 to 18 carbon atoms; Q is selected from —C(=O)R wherein R is a linear, cyclic, or branched alkyl group comprising 1 to 10 carbon atoms optionally comprising at least one of a nitrile moiety or a hydroxide moiety, an aryl group comprising 3 to 10 carbon atoms optionally comprising at least one of a nitrile moiety or a hydroxide moiety, or an alkylaryl group comprising 4 to 10 carbon atoms optionally comprising at least one of a nitrile moiety or a hydroxide moiety; o is 0, 1, or 2; p is 0 or 1; n is an integer of at least 2; and m is an integer of at least 2. Exemplary R groups include benzene and phenol.

It is noted that the n and m integers represent the number of times the polymerized unit is repeated in the polymer structure. Although written sequentially, the monomeric units may be block polymerized or randomly polymerized together, wherein the integers n and m represent the number of times the monomic unit appears in the polymer.

It is preferred that the mole ratio of the fluorinated vinylether and the vinylacetate is in the range of from 10:1 to 1:10, preferably in the range of 1:1 to 1:2.

In embodiment, the low molecular weight fluorinated polymer is derived from styrene monomers.

In embodiment, the low molecular weight fluorinated polymer is derived from styrene monomers such as those represented in formula (IX)

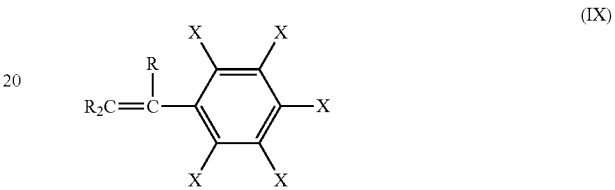

wherein each R is independently selected from H or F and each X is independently selected from H or F, wherein at least one X is F. Preferably all X are F.

In embodiment, the low molecular weight fluorinated polymer is derived from styrene monomers such as

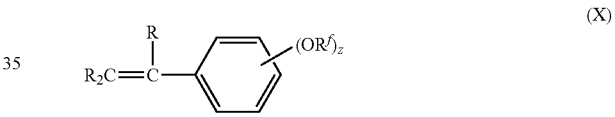

wherein each R is independently selected from H or F and R$^f$ is a fluorinated alkyl group comprising from 1 to 10 carbon atoms, and z is an integer from 1-3. The subscript z, denotes to how many (—R$^f$) groups are located off the ring, with the proviso that the fluorine content is higher than 10%. Such sytrenic monomers are disclosed in EP 355025 A2 (Fuss et al.).

In one embodiment, in addition to the interpolymerized segment comprising a pendent sulfonylamide group (such as an interpolymerized segment according to Formula (V)), the low molecular weight fluorinated (meth)acrylate polymer may comprise additional monomeric units randomly polymerized into the low molecular weight polymer. These additional monomeric units may be added to the low molecular weight fluorinated (meth)acrylate polymer to modify its properties. In one embodiment, the low molecular weight fluorinated (meth)acrylate polymer of the present disclosure is derived from at least 50, 60, 70, 80, 85 or even 90 mole % or even 100 mole % of a monomeric unit comprising a pendent sulfonylamide group.

Exemplary monomers interpolymerized with the fluorinated acrylate monomers include: (meth)acrylates such as polyalkyleneoxy (meth)acrylate, cyclohexyl (meth)acrylate, methyl methacrylate, and isobornyl (meth)acrylate; (meth)acryloyl-containing monomers such as acryloyl benzophenone and para-acryloxyethoxybenzophenone; hydroxyl-containing monomers such as a reaction product of acrylic acid and a glycidyl ester of versatic acid commercially available under the trade designation "ACE HYDROXY- LACRYLATE MONOMER" from Hexion Specialty Chemicals, Belgium, 4-hydroxybutyl acrylate commercially available from BASF AG, Germany and 2-hydroxy-3-phenoxypropyl acrylate from Shin Nakamura, Japan; carboxyl-containing monomers such as (meth)acrylic acid, itaconic acid, fumaric acid, crotonic acid, citraconic acid, and maleic acid, β-carboxyethylacrylate; and nitrogen-containing monomers such as amine functional and amide functional monomers, such as N,N-dialkylaminoalkyl (meth)acrylates, N,N-dialkyl(meth)acrylamide, N-vinyl-2-pyrrolidone, N-vinyl caprolactam, and acrylonitrile; vinyl esters such as vinyl acetate, and those commercially available under the trade designations "VEOVA-EH", "VEOVA 9" and "VEOVA 10" from Momentive Specialty Chemicals Inc., Columbus, Ohio; and combinations thereof.

To function as a tackifier, the low molecular weight fluorinated polymer of the present disclosure should decrease the plateau shear modulus of the composition relative to the high molecular weight fluorinated polymer and increase the glass transition temperature (Tg) of the composition relative to that of the high molecular weight fluorinated polymer. In one embodiment, the low molecular weight fluorinated polymer of the present disclosure should have a glass transition temperature of at least −15° C., −10° C., −5° C., or even −1° C.; and at most 40° C., 35° C., or even 30° C. To function as a tackifier, the Tg of the low molecular weight fluorinated polymer should be higher (i.e., more positive) than the Tg of the high molecular weight fluorinated polymer. In one embodiment, the Tg of the low molecular weight fluorinated polymer is at least 5, 10, 20, or even 30° C. higher than the Tg of the high molecular weight fluorinated polymer.

The low molecular weight fluorinated polymer of the present disclosure can be prepared, for example, by free radical initiated polymerization of the fluorinated (meth) acrylate, vinyl, and/or a styrene monomers along with any optional comonomers.

Such free radical polymerizations are known in the art. By adjusting the concentration of the monomers, the concentration and activity of the initiator, the temperature, and the chain-transfer agent used, if any, the molecular weight of the low molecular weight fluorinated polymer can be controlled to form the polymer. Such low molecular weight fluorinated polymer and methods of making are disclosed in U.S. Pat. No. 7,049,379 (Jariwala et al.), and U.S. Pat. Publ. No. 2016-0144312, herein incorporated by reference. The low molecular weight fluorinated polymer of the present disclosure are combined with at least a high molecular weight fluorinated polymer to provide the pressure sensitive adhesive composition.

Additional Components

In addition to the low molecular weight fluorinated polymer and the high molecular weight fluorinated polymer, the pressure sensitive adhesive composition may comprise additional components to impact the performance and/or properties of the PSA composition. Such additives include plasticizers, additional tackifiers, crosslinking agents, UV stabilizers, antistatic agents, colorants, antioxidants, fungicides, bactericides, organic and/or inorganic filler particles, and the like.

Plasticizers can be used to adjust the glass transition temperature and/or to adjust the modulus of the pressure sensitive adhesive composition to improve the adhesion of the composition to a substrate.

Exemplary plasticizers include: hydrocarbon oils (e.g., those that are aromatic, paraffinic, or naphthnenic), hydrocarbon resins, polyterpenes, rosin esters, phthalates (e.g., terephthalate), phosphates esters, phosphates (e.g., tris(2-butoxyethyl) phosphate), dibasic acid esters, fatty acid esters, polyethers (e.g., alkyl phenyl ether), epoxy resins, sebacate, adipate, citrate, trimellitate, dibenzoate, or combinations thereof.

In one embodiment, the plasticizer is a fluorinated compound, having a number average molecular weight greater than 0.5 kilograms/mol; and less than 20, 15, or even 10 kilograms/mole and a Tg less than about −20, or even −25° C. Such fluorinated plasticizers may include: an ultralow viscosity and/or liquid fluoroelastomer available under the trade designation "3M DYNEON FC 2210X" available from 3M Co., St. Paul, Minn.; "DAI-EL G101" available from Daikin Industries, Ltd., Osaka, Japan; and "VITON LM" which used to be commercially available from The Chemours Co., Wilmington, Del. Additional fluorinated plasticizes include fluorinated oils such as those available under the trade designation "KRYTOX" commercially available from The Chemours Company, Wilmington, Del.; "DEMNUM" commercially available from Daikin Industries Ltd., Osaka, Japan; and "FOMBLIN" commercially available from Solvay S. A. Brussels, Belgium.

The plasticizers may be present in the composition in any suitable amount, such as for example, amounts up to about 50, 70, 100, 200, 300, 350, or even 400 parts by weight, based on 100 parts by weight of the high molecular weight fluorinated polymer.

In additional to the low molecular weight fluorinated polymer described herein for use as a tackifier in a pressure sensitive adhesive composition, additional non-fluorinated tackifiers may be used.

Exemplary non-fluorinated tackifiers include: rosins and their derivatives (e.g., rosin esters); polyterpenes and aromatic-modified polyterpene resins; coumarone-indene resins; hydrocarbon resins, for example, alpha pinene-based resins, beta pinene-based resins, limonene-based resins, aliphatic hydrocarbon-based resins, aromatic-modified hydrocarbon-based resins; or combinations thereof. Non-hydrogenated tackifiers resins are typically more colorful and less durable (i.e., weatherable). Hydrogenated (either partially or completely) tackifiers may also be used. Examples of hydrogenated tackifiers include, for example: hydrogenated rosin esters, hydrogenated acids, hydrogenated aromatic hydrocarbon resins, hydrogenated aromatic-modified hydrocarbon-based resins, hydrogenated aliphatic hydrocarbon-based resins, or combinations thereof. Examples of additional synthetic tackifiers include: phenolic resins, terpene phenolic resins, poly-t-butyl styrene, acrylic resins, or combinations thereof. In one embodiment, the non-fluorinated tackifier may be present in the pressure sensitive composition in an amount of greater than about 10, 20, or even 40 parts by weight and no more than 100 parts by weight based on 100 parts by weight of the high molecular weight fluoropolymer.

Other optional additives include, for example, stabilizers (e.g., anti-oxidants or UV-stabilizers), pigments, dyes, or combinations thereof. Use of such additives is well known to those of ordinary skill in the art. The additives may be present in an amount from 0.5% by weight to 5% by weight based upon the weight of the total pressure sensitive adhesive. Certain additives may be of lower weight percent, e.g., a pigment may be added at less than 0.05% or even less than 0.005% by weight.

Preferred anti-oxidants include phenols, phosphites, thioesters, amines, polymeric hindered phenols, copolymers of 4-ethyl phenols, reaction product of dicyclopentadiene and butylene, or combinations thereof. Additional examples include phenyl-alpha-naphthylamine, phenyl-beta-naphthylamine, phenyl-beta-naphthylene, 2,2'-methylene bis (4-methyl-6-tertiary butyl phenol), phenolic-based anti-oxidants sold under the trade designation "CIBA IRGANOX 1010" by from Ciba Specialty Chemicals Corp., Tarrytown, N.Y., or combinations thereof.

UV-stabilizers such as UV-absorbers are chemical compounds that can intervene in the physical and chemical processes of photoinduced degradation. Exemplary UV-absorbers include: benzotriazole compound, 5-trifluoromethyl-2-(2-hydroxy-3-alpha-cumyl-5-tert-octylphenyl)-2H-benzotriazole, or combinations thereof. Other exemplary benzotriazoles include: 2-(2-hydroxy-3,5-di-alpha-cumylphehyl)-2H-benzotriazole, 5-chloro-2-(2-hydroxy-3-tert-butyl-5-methylphenyl)-2H-benzotiazole, 5-chloro-2-(2-hydroxy-3,5-di-tert-butylphenyl)-2H-benzotriazole, 2-(2-hydroxy-3,5-di-tert-amylphenyl)-2H-benzotriazole, 2-(2-hydroxy-3-alpha-cumyl-5-tert-octylphenyl)-2H-benzotriazole, 2-(3-tert-butyl-2-hydroxy-5-methylphenyl)-5-chloro-2H-benzotriazole, or combinations thereof. Additional exemplary UV-absorbers include 2(-4,6-diphenyl-1-3,5-triazin-2-yl)-5-hexcyloxy-phenol, and those available from Ciba Specialty Chemicals Corp. sold under the trade designations "CIBA TINUVIN 1577" and "CIBA TINUVIN 900". In addition, UV-absorber(s) can be used in combination with hindered amine light stabilizer(s) (HALS) and/or anti-oxidants. Exemplary HALSs include those available from Ciba Specialty Chemicals Corp. sold under the trade designations "CIBA CHIMASSORB 944" and "CIBA TINUVIN 123".

In one embodiment, to improve the bond strength or other properties of the adhesive, the polymer (for example, the low molecular weight fluorinated polymer and/or the high molecular weight fluorinated polymer) may comprise pendent functional groups, such as —OH and/or —COOH groups or salts thereof, which are present along the polymer chain or at the ends of the polymer chains. Such groups may assist in improving the bond strength of the adhesive. In one embodiment, these pendent functional groups comprise less than 10, 5, 3, or even 2 mol % and more than 0.1, 0.5, or even 1 mol % based on the respective polymer.

Pressure Sensitive Adhesive Composition

In one embodiment, the pressure sensitive adhesive composition would comprise at least 10, 25 or even 50 parts; and no more than 400, 300, 200 or even 100 parts of the low molecular weight fluorinated polymer per 100 parts of the high molecular weight fluorinated polymer.

The pressure sensitive adhesive composition comprising the low molecular weight fluorinated polymer and the high molecular weight fluorinated polymer, along with optional additives may be formulated in a solvent or solventless process.

The pressure sensitive adhesive composition according to the invention may be obtained using techniques commonly known to those skilled in the art of formulating pressure sensitive adhesive formulations.

In one embodiment, the pressure sensitive adhesive composition is hot melt processable.

In one embodiment, the pressure sensitive adhesive composition is crosslinked.

The crosslinked pressure sensitive adhesives and the uncrosslinked or crosslinkable pressure sensitive adhesive compositions, in particular the hot melt and solution processable adhesives and precursors thereof, may advantageously be used to prepare a wide range of adhesive tapes and articles. Many of these tapes and articles contain backings or other substrates to support the layer of adhesive.

Double-sided tapes are adhesive tapes that have adhesive on opposite sides of a backing layer. The adhesives on the two sides may be the same or different. The backing layer may be a film, a non-woven web, paper, or a foam. Other adhesive tapes and articles do not contain a backing or substrate layer and therefore are free standing adhesive layers. Transfer adhesive tapes are an example of such an adhesive article. Transfer adhesives tapes, also called transfer tapes, have an adhesive layer delivered on one or more release liners. The adhesive layer has no backing within it so once delivered to the target substrate and the liner is removed, there is only adhesive. Some transfer tapes are multi-layer transfer tapes with at least two adhesive layers that may be the same or different.

Transfer tapes are widely used in the printing and paper making industries for making flying splices, as well as being used for a variety of bonding, mounting, and matting applications both by industry and by consumers.

In one embodiment, the pressure sensitive adhesive compositions may be easily coated upon a carrier film by conventional coating techniques to produce adhesive coated sheet materials or coated and cured via ultraviolet or e-beam radiation. The coating thickness will vary depending upon various factors such as, for example, the particular application or the coating formulation. Coating thicknesses of 10, 20, 25, 30, 40, 50, 60, 75, 100, 125, 150, 200, 250 µm, or 300 µm are contemplated.

The carrier film may be a flexible or inflexible backing material, or a release liner. Exemplary materials useful as the carrier film for the adhesive articles of the disclosure include, but are not limited to, polyolefins such as polyethylene, polypropylene (including isotactic polypropylene and high impact polypropylene), polystyrene, polyester, including poly(ethylene terephthalate), polyvinyl chloride, poly (butylene terephthalate), poly(caprolactam), polyvinyl alcohol, polyurethane, poly(vinylidene fluoride), cellulose and cellulose derivatives, such as cellulose acetate and cellophane, and wovens and nonwovens. Commercially available carrier film include kraft paper (available from Monadnock Paper, Inc.); spun-bond poly(ethylene) and poly(propylene), such as those available under the trade designations "TYVEK" and "TYPAR" (available from DuPont, Inc.); and porous films obtained from poly(ethylene) and poly(propylene), such as those available under the trade designations "TESLIN" (available from PPG Industries, Inc.), and "CELLGUARD" (available from Hoechst-Celanese). The carrier film delivers the pressure sensitive adhesive of the present disclosure to the desired substrate. The carrier film may be blank or may comprise on the surface opposite the pressure sensitive adhesive, a pigment, indicia, text, design, etc., which is then fixedly attached to the surface of the substrate.

In one embodiment, a layer of the pressure sensitive adhesive is fixedly attached to a backing layer. The backing layer may be any material conventionally utilized as a tape backing. In one embodiment, a chemical primer layer is disposed between the pressure sensitive adhesive and the backing layer to improve the adhesion of the pressure sensitive adhesive to the backing layer. Such primer layers are known in the art. In one embodiment, the backing material is corona treated, plasma treated, and/or nanostructured to improve the adhesion of the PSA to the backing material. Such nanostructure materials can be made as described, for example, in WO 2014/047782 (David, et. al).

The thickness of the pressure sensitive adhesive layer is typically at least 10, 15, 20, or 25 microns (1 mil) ranging up to 500 microns (20 mils) thickness. In some embodiments, the thickness of the pressure sensitive adhesive layer is no greater than 400, 300, 200, or 100 microns. The pressure sensitive adhesive can be coated in single or multiple layers.

In one embodiment, the pressure sensitive adhesive composition has a viscoelastic window as defined by E. P. Chang, J. Adhesion, vol. 34, pp. 189-200 (1991) such that the dynamic mechanical properties of the pressure sensitive adhesive composition as measured by well-known techniques fall within the following ranges measured at 25° C.:

G' measured at an angular frequency of 0.01 rad/s is greater than $1 \times 10^3$ Pa G' measured at an angular frequency of 100 rad/s is less than $1 \times 10^6$ Pa G" measured at an angular frequency of 0.01 rad/s is greater than $1 \times 10^3$ Pa G" measured at an angular frequency of 100 rad/s is less than $1 \times 10^6$ Pa.

In one embodiment, the adhesive composition further meets the Dahlquist criterion for tack in that the G' measured at 1 rad/s is less than $3 \times 10^5$ Pa.

In some embodiments, the pressure sensitive adhesive composition has a storage modulus G' of less than $1 \times 10^6$ Pa measured at 1 rad/s.

In one embodiment, the pressure sensitive adhesives of the present disclosure have the ability to adhere to a variety of surfaces under extreme conditions. The articles of the present disclosure can be subjected to harsh weather conditions such as temperature extremes, humidity, atmospheric pollutants, road salt, and infrared, visible, and ultraviolet light.

In one embodiment, the pressure sensitive adhesive composition of the present disclosure have a 180° peel to stainless steel of at least 10, 15, 20, 25, 30, 35, 40, 45, 50, 55, 60, 80, 100, 125, 150, or even 160 N/dm at a peel rate of 300 mm/minute peel rate after a 24 hour dwell time at ambient conditions.

In one embodiment, the pressure sensitive adhesive composition of the present disclosure have a 180° peel to polyethylene of at least 10, 15, 20, 25, 30, 35, 40, 45, 50, 55, 60, 80, 100, 125, or even 150 N/dm at a peel rate of 300 mm/minute peel rate after a 24 hour dwell time at ambient conditions.

In one embodiment, the pressure sensitive adhesive composition of the present disclosure have a 180° peel on a fluorinated surface of at least 5, 10, 15, 20, 25, 30, 35, 40, 45, 50, 55, 60, 80, 100, 125, or even 150 N/dm at a peel rate of 300 mm/minute peel rate after a 24 hour dwell time at ambient conditions. Such fluorinated surfaces include: FEP (fluorinated ethylene-propylene) copolymers containing TFE and 5-25 wt % HFP, such as for example "3M DYNEON FEP 6307Z" or PTFE (polytetrafluoroethylene).

In some embodiments, the pressure sensitive adhesive may exhibit the same or higher level of adhesion to stainless steel or a fluorinated surface after exposure to elevated temperatures and humidity, such as after a 72 hour dwell time at 65° C. and 80% relative humidity. In some embodiments, the increase in adhesion is no greater than 300%, 250%, 200%, 150%, 100%, 90%, 80%, or 70% (as determine by subtracting the 24 hr room temperature value from the aged peel value, dividing by the 24 hr room temperature value and multiplying by 100%).

The pressure sensitive adhesives of the present disclosure surprisingly show good adhesion to a variety of low surface energy substrates and under a variety of complex bonding situations.

In addition, the pressure sensitive adhesive may be applied to surfaces with different topographies such as smooth and/or rough surfaces, which make bonding much more complex.

In some applications, organic fluids, such as oil or fuel may contact the substrate and/or the pressure sensitive adhesive and decrease the performance of the pressure sensitive adhesive. In one embodiment, the pressure sensitive adhesive of the present provides resistance to solvent, oil, and benzene/diesel.

In one embodiment, the pressure sensitive adhesive composition of the present disclosure have a swell ratio of less than 1.2 or even a swell ratio of no more than 1.01 in oleic acid, and/or a 70% isopropyl alcohol aqueous solution.

The pressure sensitive adhesive composition described herein may also be disposed on a transparent film for use as a removable or permanent surface protection film. In some embodiments, the pressure sensitive adhesive and transparent film having a transmission of visible light of at least 90 percent.

The pressure sensitive adhesives described herein are suitable for use in the areas of electronics, appliances, automotive, and general industrial products. In some embodiments, the pressure sensitive adhesive can be utilized in (e.g. illuminated) displays that can be incorporated into household appliances, automobiles, computers (e.g. tablets), and various hand-held devices (e.g. phones).

The presently disclosed adhesive composition can be laminated to solid substrates at ambient temperature (25° C.) and provide good high temperature/humidity stability and chemical resistance. The superior oil (e.g. oleic acid) and alcohol resistance of the presently disclosed adhesive composition makes the adhesive attractive for various applications including automotive, aerospace, electronics and appliance markets where maintaining adhesive bond strength under high temperature/humidity and chemical environment are of importance.

In some embodiments, the pressure sensitive adhesive described herein are suitable for bonding internal components or external components of illuminated display devices such as liquid crystal displays (LCDs) and light emitting diode (LEDs) displays such as cell phones (including Smart phones), wearable (e.g. wrist) devices, car navigation systems, global positioning systems, depth finders, computer monitors, notebook and tablet computer displays.

Exemplary embodiments of the present disclosure include, but are not limited to the following.

Embodiment 1

A pressure sensitive adhesive comprising:
(a) a high molecular weight fluorinated polymer having at least one Tg less than about 0° C. and a number average molecular weight greater than about 20 kilograms/mole; and
(b) a low molecular weight fluorinated polymer (i) derived from an ethylenically unsaturated fluorinated monomer, (ii) having a Tg greater than about −15° C., and (iii) a number average molecular weight less than about 18 kilograms/mole.

Embodiment 2

The pressure sensitive adhesive of embodiment 1, wherein the low molecular weight fluorinated polymer is derived from at least one of an acrylate monomer, a vinyl monomer, a styrene monomer, and combinations thereof.

Embodiment 3

The pressure sensitive adhesive of any one of the previous embodiments, wherein the low molecular weight fluorinated polymer is derived from at least one of vinylidene fluoride, hexafluoropropylene, tetrafluoroethylene, and combinations thereof.

Embodiment 4

The pressure sensitive adhesive of any one of the previous embodiments, further comprising a plasticizer.

Embodiment 5

The pressure sensitive adhesive of embodiment 4, wherein the plasticizer has a molecular weight less than 20,000 grams/mol and a Tg less than about −20° C.

Embodiment 6

The pressure sensitive adhesive of embodiment 4 or embodiment 5, wherein the plasticizer is fluorinated.

Embodiment 7

The pressure sensitive adhesive of any one of the previous embodiments, wherein at least 10% of all of the C—H and C—F bonds in the high molecular weight fluorinated polymer are C—F bonds.

Embodiment 8

The pressure sensitive adhesive of any one of the previous embodiments, wherein at least 10% of all of the C—H and C—F bonds in the low molecular weight fluorinated polymer are C—F bonds.

Embodiment 9

The pressure sensitive adhesive of any one of the previous embodiments, wherein at least 60% of all of the C—H and C—F bonds in the high molecular weight fluorinated polymer are C—F bonds.

Embodiment 10

The pressure sensitive adhesive of any one of the previous embodiments, wherein the high molecular weight fluorinated polymer is derived from at least one of tetrafluoroethylene, vinylidene fluoride, fluorinated vinyl ethers, fluorinated allyl ethers, hexafluoropropylene, and combinations thereof.

Embodiment 11

The pressure sensitive adhesive of any one of the previous embodiments, wherein the high molecular weight fluorinated polymer is partially fluorinated.

Embodiment 12

The pressure sensitive adhesive of any one of embodiments 1-10, wherein the high molecular weight fluorinated polymer is fully fluorinated.

Embodiment 13

The pressure sensitive adhesive of any one of the previous embodiments, wherein the low molecular weight fluorinated polymer is partially fluorinated.

Embodiment 14

The pressure sensitive adhesive of any one of embodiments 1-12, wherein the low molecular weight fluorinated polymer is fully fluorinated.

Embodiment 15

The pressure sensitive adhesive of any one of the previous embodiments, wherein the low molecular weight fluorinated polymer comprises a plurality of pendant sulfonylamide groups.

Embodiment 16

The pressure sensitive adhesive of embodiment 15, wherein the low molecular weight fluorinated polymer comprises a segment according to formula I:

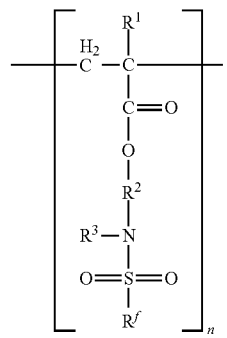

wherein $R^1$ is H or $CH_3$; $R^2$ is a linking group; $R^3$ is H or an alkyl group; $R_f$ comprises a fully fluorinated group; and n is at least 2.

Embodiment 17

The pressure sensitive adhesive of any one of the previous embodiments, wherein the low molecular weight fluorinated polymer comprises pendent perfluorinated diether moieties.

Embodiment 18

The pressure sensitive adhesive of any one of the previous embodiments, wherein the low molecular weight fluorinated polymer comprises a segment according to formula III:

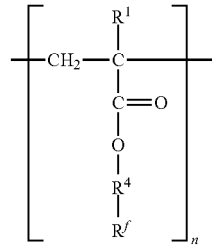

wherein $R^1$ is H or $CH_3$; $R^4$ is an alkylene group; $R_f$ comprises a fully fluorinated alkyl group; and n is at least 2.

Embodiment 19

The pressure sensitive adhesive of any one of the previous embodiments, comprising 10 to 200 parts of the low molecular weight fluorinated polymer to 100 parts of the high molecular weight fluorinated polymer.

Embodiment 20

The pressure sensitive adhesive of any one of embodiments 4-19, comprising the plasticizer and wherein the pressure sensitive adhesive meets all of the following criteria:
  G' measured at an angular frequency of 0.01 rad/s is greater than $1 \times 10^3$ Pa,
  G' measured at an angular frequency of 100 rad/s is less than $1 \times 10^6$ Pa,
  G" measured at an angular frequency of 0.01 rad/s is greater than $1 \times 10^3$ Pa, and
  G" measured at an angular frequency of 100 rad/s is less than $1 \times 10^6$ Pa.

Embodiment 21

The pressure sensitive adhesive according to any one of the previous embodiments, wherein the high molecular weight polymer comprises a functional pendent group.

Embodiment 22

The pressure sensitive adhesive according to embodiment 21, wherein the functional pendent group comprises at least one of —OH, —COOH, and combinations and salts thereof.

Embodiment 23

The pressure sensitive adhesive according to any one of the previous embodiments, wherein the low molecular weight fluorinated polymer a functional pendent group.

Embodiment 24

The pressure sensitive adhesive according to embodiment 23, wherein the functional pendent group comprises at least one of —OH, —COOH, and combinations and salts thereof.

Embodiment 25

The pressure sensitive adhesive of any one of the previous embodiments, wherein the high molecular weight fluorinated polymer is at least partially crosslinked.

Embodiment 26

The pressure sensitive adhesive of any one of the previous embodiments, further comprising at least one of magnesium oxide, zinc oxide, sodium stearate, and magnesium oxalate.

Embodiment 27

The pressure sensitive adhesive of any one of the previous embodiments, wherein the pressure sensitive adhesive composition has a 180° peel to stainless steel of at least 10 N/dm at a peel rate of 300 mm/min after a 24 hour dwell time at 25° C. and 50±5% relative humidity.

Embodiment 28

The pressure sensitive adhesive of any one of the previous embodiments, wherein the pressure sensitive adhesive composition has a swell ratio of less than 1.2 in oleic acid and less than 1.2 in 70% isopropyl alcohol aqueous solution after 24 hours at 65° C.

Embodiment 29

The pressure sensitive adhesive of any one of the previous embodiments, wherein the pressure sensitive adhesive composition has a chemical resistance rating of at least 3 for oleic acid and/or a 70% isopropyl alcohol aqueous solution after 8 hours at 70° C.

Embodiment 30

The pressure sensitive adhesive of any one of the previous embodiments, wherein the high molecular weight fluorinated polymer is not a thermoplastic elastomer.

Embodiment 31

The pressure sensitive adhesive of any one of the previous embodiments, wherein the Tg of the low molecular weight fluorinated polymer is higher than the at least one Tg of the high molecular weight fluorinated polymer.

Embodiment 32

The pressure sensitive adhesive of any one of the previous embodiments, wherein the Tg of the low molecular weight fluorinated polymer is at least 5° C. higher than the at least one Tg of the high molecular weight fluorinated polymer.

Embodiment 33

A multilayered article comprising the pressure sensitive adhesive according to any one of the previous embodiments and a backing.

Embodiment 34

A multilayered article comprising the pressure sensitive adhesive according to any one of the previous embodiments and a liner.

EXAMPLES

Unless otherwise noted, all parts, percentages, ratios, etc. in the examples and the rest of the specification are by weight (based on solids), and all reagents used in the examples were obtained, or are available, from general chemical suppliers such as, for example, Sigma-Aldrich Company, Saint Louis, Mo.

These abbreviations are used in the following examples: cm=centimeter; dl=deciliter; g=grams; min=minutes; mJ=milliJoules; hr=hour; ° C.=degrees Celsius; rad=radian; Hz=Herta; and pph=parts per hundred.

Test Methods

Molecular Weight Distribution

The molecular weight distribution of the low molecular weight fluorinated polymer was characterized using conventional gel permeation chromatography (GPC). The number average molecular weight (Mn), the weight average molecular weight (Mw) were determined for each sample against a standard calibration curve.

GPC-Method 1:

The GPC instrumentation, which was obtained from Waters Corporation (Milford, Mass.), included a high pressure liquid chromatography pump (Model 600), an autosampler (Model WISP717), and a refractive index detector (Model 2414).

The chromatograph was equipped with three 10 micron PLgel MIXED-B columns 300 mm×7.5 mm, available from Agilent Technologies. (Santa Clara, Calif., USA).

Each sample of polymeric solution was treated with an ethereal diazomethane solution. The reaction was done at room temperature for at least 30 minutes. The sample was dried under a gentle flow of nitrogen until dryness. The residue was dissolved in tetrahydrofuran at a concentration of 0.1 percent (weight/volume). The solution was filtered through a 0.45 micron polytetrafluoroethylene filter, available from Machery-Nagel (Duren, Germany).

The resulting sample was injected into the GPC instrument and eluted with tetrahydrofuran at a rate of 1 milliliter per minute through the columns that were maintained at 40° C. The system was calibrated with polystyrene standards using $3^{rd}$ order fit analysis to establish a calibration curve.

GPC-Method 2:

The GPC instrumentation, which was obtained from Agilent Technologies (Santa Clara, Calif.), included a high pressure liquid chromatography pump and auto-sampler (Model 1100), and a refractive index detector (Model 1260).

The chromatograph was equipped with 2 PLGel 10 µm Mixed-B (nominal MW range 500-1e7 Daltons) and a 1 PLGel 5 µm Mixed-D (nominal MW range 200-400,000 Daltons), both 7.8 mm×300 mm, available from Agilent Technologies. (Santa Clara, Calif., USA).

Approximately 50 mg of solids from each sample was dissolved in 10 mL of tetrahydrofuran inhibited with 250 ppm of butylated hydroxytoluene. The solution was filtered through a 0.45 micron polytetrafluoroethylene syringe filter.

The resulting sample was injected into the GPC instrument and eluted at a rate of 1 milliliter tetrahydrofuran per minute through the columns that were maintained at 40° C. The system was calibrated with polystyrene standards using $3^{rd}$ order fit analysis to establish a calibration curve.

Glass Transition Temperature

The glass transition temperature (Tg) was determined following ASTM D 7426-08 (Reapproved 2013), unless otherwise noted, by differential scanning calorimetry (DSC Q200 available from TA Instruments, New Castle, Del.) with liquid nitrogen as the coolant. The samples were equilibrated at about −80° C. and held for 10 min. A DSC scan was obtained from −80° C. to 200° C. (or −80° C. to 150° C.) and a scan rate of 10° C./min was used. The purge gas was helium (99.999% pure, dried over a moisture filter) flowing at 50 mL/min. The midpoint temperature was used to report the Tg.

Dynamic Mechanical Testing

Dynamic mechanical testing was conducted using standard methods using parallel plate geometry in an oscillatory shear mode with stress and strain oscillating sinusoidally at a controlled frequency, expressed herein as an angular frequency, radians/sec, where one cycle of oscillation is $2\pi$ radians. As described in standard viscoelasticity references (e.g. "Viscoelastic Properties of Polymers," J. D. Ferry, $3^{rd}$ edition, John Wiley and Sons, 1980), the material property parameters, dynamic modulus (G*), and phase angle (δ) were determined. G* is the ratio of peak-to-peak stress amplitude to peak-to-peak strain amplitude and the phase angle is the shift between the phase of the stress wave and that of the strain wave, expressed either in degrees or radians. One full cycle of oscillation is 360 degrees or $2\pi$ radians. From these parameters, the parameters G', G" and tan δ are derived as follows:

$$G' = G^* \cos \delta$$

$$G'' = G^* \sin \delta$$

tan δ=tangent of δ which is also equal to $G''/G'$

A sample of the adhesive composition was prepared by compression molding or by lamination of coated layers to a thickness of approximately 1 mm. From this sample, an 8 mm diameter disk was cut using a die. That disk shaped sample was mounted between two 8 mm diameter parallel plate fixtures of a TA Instruments Discovery Hybrid Rheometer Model DHR-3 or an ARES G2 rheometer also made by TA Instruments.

Temperature Ramp Test to Determine DMA Tg:

These tests were conducted using the DHR-3 rheometer. Using automatic control of the axial force of the fixtures on the sample, the material was subjected to cyclic shear oscillation while the instrument monitored the oscillating shear stress and shear strain. A constant oscillation angular frequency of 1 rad/s (cyclic frequency of ½π Hz) was applied with a shear strain of 5% while the sample temperature was ramped from 25° C. to −65° C. at a rate of 3° C./min. When the shear stress exceeded 50 kPa, the system switched to a controlled shear stress mode at a constant shear stress of 50 kPa. When the G* exceeded $5 \times 10^8$ Pa or when the temperature reached −65° C. (whichever came first), the temperature was returned to 20° C. while maintaining axial force control. The temperature was then ramped from 20° C. to 150° C. or until the G* value fell below $10^3$ Pa using a constant strain of 5%.

The DMA glass transition temperature (DMA Tg) was taken as the temperature at which the value of the tangent of the phase angle, δ, (tan δ) reached a maximum during the phase where the shear storage modulus rises from about $10^5$ Pa to above $10^8$ Pa as the temperature drops.

Frequency Sweep Test for Viscoelastic Window and Dahlquist Criterion Properties:

These tests were conducted using the ARES G2 rheometer. The 8 mm disk shaped sample was mounted between 8 mm diameter fixtures, first applying an axial force of about 100 g to achieve good bonding between the fixture and the sample and then the axial force was controlled near zero g+/−20 g. A frequency sweep was conducted with the sample controlled at 25° C. and a constant shear strain of 5% to measure the properties at 0.01, 1, and 100 rad/s angular frequency.

Adhesive Testing

Unless otherwise indicated, prior to testing all adhesive samples were conditioned in a climate room set at ambient conditions (23° C.+/−2° C. and 50%+/−5% relative humidity) during 12 hours.

Substrates Used:

Stainless steel (SS) panels: The stainless steel panels (51 mm wide by 127 mm long by 1.2 mm thick having a bright annealed finish (in accordance with Specification ASTM A666, Type 304) were obtained from ChemInstruments, Incorporated, Fairfield, Ohio). Prior to use stainless steel panels were cleaned by wiping the panels with a lint free tissue first with a pass of methyl ethyl ketone (MEK), followed by a wipe with n-heptane and finally another pass with methyl ethyl ketone (MEK). Wiping of the panels per pass of solvent was always done until dryness.

Tetrafluoroethene-hexafluoropropene: An FEP (a co-polymer derived from tetrafluoroethene and hexafluoropropene) film was made from FEP granules being available under the trade designation "FEP 6307" from 3M Co. The FEP films were attached to clean stainless steel plates with an adhesive film. Prior to use, the exposed FEP surface of the multilayered construction was cleaned with a 90/10 mixture of isopropyl alcohol (IPA) and water.

Polytetrafluorethylene (PTFE) Panels

PTFE test panels (51 mm wide by 127 mm long by 2 mm thick) were obtained from Rocholl Gmbh-Aglasterhausen Germany. They were cleaned prior to use with a 90/10 isopropanol/water.

180° Peel Adhesion

TM-1: 180° Peel Adhesion

Test method TM-1 180° peel adhesion tests were performed in accordance with AFERA 5001 (version 2004) test method.

Adhesive test samples were prepared by slitting adhesive strips of 25.4 mm×300 mm in dimension using a specimen cutter holding two single-edged razor blades in parallel planes of the adhesive. The strip was placed without pressure onto a (cleaned) test substrate, after which the strip was fixed onto the substrate using a 2 kg hand-held rubber-covered roller at a rate of 10+/−0.5 mm/s with 2 passes in each direction. After a dwell time, as indicated in the examples, in the climate room, a 180° peel test was performed using a FP-2255 Peel Tester (manufactured by Thwing-Albert Instrument Company), with data collected and averaged over 10 seconds. The adhesive strip was pulled at a speed of 300 mm/min. Three measurements were made per example and the average recorded in N/dm. The test results were reported as "180° Peel TM-1"

TM-2: 180° Peel Adhesion

Adhesive test samples were prepared by slitting adhesive strips of 12.7 mm×127 mm in dimension. Two replicates were prepared for each sample. The exposed adhesive surface of the test strips were adhered along the length of the plate. The adhesive strip was then rolled-over 2 times using a 2.0 kg rubber roller. The peel adhesion strength was evaluated using an Imass model SP2000 peel tester (IMASS Corp., Accord, Mass.), with the test specimen held horizontally on the plate and the adhesive being peeled at an angle of 180° and at a speed of 300 mm/min. The average of two test specimens was reported in N/dm. The test results were reported as "180° Peel TM-2"

TM-3: Peel Adhesion Strength (Aging)

Test samples with adhesive strips of 5 mm by 127 mm were prepared as described above. Before testing, the samples were dwelled for 24 hours in a climate room set at ambient conditions followed by 72 hours dwell in an oven set at 65° C. and having 80% RH. The samples were then returned to the climate room for 24 hours prior to adhesion testing. The peel adhesion strength was evaluated using an Instron equipped with 1000 N load cell, using a crosshead speed of 300 mm/min, at an angle of 180° with the test specimen held in the bottom clamp and the tail in the top clamp. The average of two test specimens was reported in N/decimeter (N/dm). The test results were reported as "Aged Peel TM-3".

Static Shear Strength on Stainless Steel (SS)

The static shear test method determines the ability of pressure-sensitive adhesive tapes to remain adhered under constant load applied parallel to the surface of the tape and substrate. The test was performed according to AFERA 5012 Test Method "Self Adhesive Tapes-Measurement of Static Shear Adhesion EN 1943 2002" (version 2004).

Static shear strength was measured on cleaned stainless steel panels having a dimension of 50 mm by 125 mm (and a minimum thickness of 1.1 mm).

A 1 inch (25.4 mm) wide strip of adhesive was cut from the adhesive tape by using a specimen cutter holding two single-edge razor blades in parallel planes, the blades spaced 1 inch (25.4 mm) apart. The adhesive strip was then placed onto a clean stainless steel panel covering a 1 inch×1 inch (25.4 mm×25.4 mm) area of the stainless steel panel. The adhesive strip was then rolled-over twice in each direction using a hand-held rubber-covered 2 kg hand-roller at an approximate rate of 10 mm+/−0.4 mm/s. A 1000 g (1 kg) weight was used as the static load. The test samples were placed on an automated timing apparatus in an air conditioned room at ambient conditions (23° C.+/−2° C. and 50%+/−5% relative humidity). Alternatively, the samples were left in the air conditioned room for a time as indicated in the example (indicated as 'dwell time') before testing. The time when the load dropped was recorded (min). When the load did not fall down after 10000 min, the test was discontinued and the result identified as 10000+. The data reported are the averages of three measurements.

Chemical Resistance Test

Samples were prepared by slitting test strips 0.5 inch×0.5 inch (12.7 mm×12.7 mm) from each of the adhesive transfer tape samples. Then, the release liner on one surface was removed and the test strips were attached (stuck) to the bottom of a glass petri dish. The release liner on the second, exposed surface of the test strips were removed and the petri dish containing the attached sample test strips were set aside to dwell at room temperature (about 23° C.) for 15 minutes. The test strips were then submerged in either (a) oleic acid or (b) a mixture of isopropyl alcohol (IPA) and water at a weight ratio of 70:30 (IPA/H$_2$O) at 70° C. for 8 hrs. The resistance of the adhesive sample to oleic acid or IPA/H$_2$O mixture was rated using the following guidelines and reported.

Observation Chemical Resistance Rating:
1=Adhesive sample came off the petri dish or dissolved completely
3=Adhesive sample partially detached or dissolved along the edge
5=Adhesive sample did not detach or dissolve Swell Test Ratio A portion of the dry adhesive polymer (0.50-1.00 g dry) was separated from the release liner, weighed and then placed in a glass vial. Two samples in glass vials were prepared. A 70/30 mixture of IPA and water was added to one of the glass vials to completely immerse the sample. In the second glass vial, oleic acid (10 g) was added to completely immerse the sample. Both vials were sealed and placed in an oven maintained at a temperature of 65° C. for a period of 24 hours. The glass vials were removed from the oven and allowed to cool to ambient temperature. The soaked samples were taken out from the vials, wiped reasonably dry with tissue paper, and weighed. The swelling ratio for each sample was determined by taking the dry weight of each sample over its weight after soaking in the solvent.

Liner Release Test Method

A 25 micrometer (1.0 mil) primed PET film was laminated to a layer of adhesive. A 25.4 mm strip was cut to form the test sample. The liner release value was a measure of the force required to pull the adhesive tape from the PET release liner at an angle of 180° at a rate of 2.3 m (90 inches)/minute. The IMass model SP2000 peel tester (IMASS Corp., Accord, Mass.) was used to record the peel adhesion value in grams/inch. The data is reported as an average of 2 measurements.

Materials Table

| Designation | Descriptor | Supplier |
|---|---|---|
| AEBP | para-acryloxyethoxybenzophenone | Prepared generally according to U.S. Pat. No. 4,737,559, example B |
| IBOMA | Isobornyl methacrylate | Sigma Aldrich |
| C4MA | N-methyl perfluorobutylsulphonamidoethylmethacrylate | Prepared generally according example 2 in U.S. Pat. No. 6,664,354 |
| PPVE2 | $CF_2=CFOCF_2CF(CF_3)OCF_2CF_2CF_3$, Perfluoro(5-methyl-3,6-dioxanon-1-ene) | Available from Abcr GmbH, Kalsruhe, Germany |
| VA | vinylacetate | Available from Sigma Aldrich |
| DMAEMA | Dimethylaminoethyl methacrylate | Degussa AG, Essen, Germany |
| Fluoropolymer 1 | High molecular weight fluoropolymer made from VDF/HFP copolymer having a theoretical monomer ratio of 61 wt % VDF/ 39 wt % HFP; Tg −23° C.; Mn 76 kg/mole, Mw 132 kg/mole | Can be prepared similar to Example 4 of U.S. Pat. No. 6,693,152 |
| Fluoropolymer 2 | Peroxide curable high molecular weight fluoroelastomer made from VDF/HFP/TFE and a cure site monomer, having 66% fluorine content and a theoretical monomer ratio of 60% VDF/31% HFP/9% TFE by weight; Tg −23° C. Mn 82 kg/mole, Mw 234 kg/mole. | Can be prepared similar to Terpolymer A in example 4 of U.S. Pat. No. 7,138,470 |
| Fluoropolymer 3 | Peroxide curable VDF/HFP/TFE fluoroelastomer terpolymer comprising cure sites available under the trade designation "3M DYNEON FLUOROELASTOMER FPO 3630" having a Tg −19° C., a Mooney viscosity (ML 1 + 10@ 121° C.) of about 37, and a Mn greater than 25 kg/mol. | 3M Co., St. Paul, MN |
| Fluoropolymer 4 | VDF/HFP copolymer, available under the trade designation "3M DYNEON FLUOROELASTOMER FC2178" having a Tg −22° C.; Mn 180 kg/mole, Mw 480 kg/mole | 3M Co., St. Paul, MN |
| Fluoropolymer 5 | VDF/HFP/PMVE fluoropolymer having a theoretical monomer ratio of 51.3 wt % VDF/11.3 wt % TFE/ 37.4 wt % PMVE; Tg −32° C. Mn 82 kg/mole, Mw 139 kg/mole | Prepared generally according Example to 1 of EP 2868674 |
| Fluoropolymer 6 | A VDF/HFP fluoropolymer having a theoretical monomer ratio of 61 wt % VDF/ 39 wt % HFP; Tg −23° C., Mn 80 kg/mole, Mw 223 kg/mole | Prepared generally according to Example 17 of U.S. Pat. No. 8,835,551 |
| Fluoropolymer 7 | Amine or bisphenol curable fluoroelastomer, comprising VDF/HFP/TFE, 68.6% F available under the trade designation "3M DYNEON FLUOROELASTOMER FT 2430"; Mooney viscosity (ML 1 + 10@ 121° C.) of about 31, and a Mn greater than 25 kg/mol.. | 3M Co., St. Paul, MN |
| Fluorinated plasticizer 1 | a liquid fluoroelastomer made from VDF/HFP copolymer, having 66% fluorine content; viscosity (105° C., spindle #27, 18.7 g, 5 rpm) approximately 20000 centipoise. Mn about 9 kg/mole. | Can be prepared according to Example 2 of U.S. Pat. No. 5,208,305 |
| IOTG | VDF/HFP fluoropolymer, commercially available under the trade designation "VITON LM". Brookfield viscosity of approximately 2000 centipoise (measured at 100° C.) and a Mn of approximately 6 kilograms/mole | The Chemours Company |
| IEM | Isocyanato ethyl methacrylate (KARENZ MOI) | Showa Denko, Tokyo, Japan |
| IOA | Isooctyl acrylate | SIGMA-ALDRICH |
| IOTG | Isooctylthioglycolate | SIGMA-ALDRICH |
| C4MA | N-methyl perfluorobutylsulphonamidoethylmethacrylate | Prepared generally according to example 2 in U.S. Pat. No. 6,664,354 |
| MEFBSE | N-Methylperfluorobutylsulphonamido ethyl alcohol | Prepared generally according to example 2 in U.S. Pat. No. 6,664,354 |
| MEFBSEIEM | 1/1 adduct of MEFBSE and IEM | Prepared according to the method listed below |
| NVC | N-Vinyl caprolactam | Sigma-Aldrich |
| PETMP | Pentaerythritol tetrakis(3-mercaptopropionate) | Sigma-Aldrich |
| DiPETMP | Dipentaerythritol hexa(3-mercaptoproprionate) | Bruno Bock Chemicals |
| CF3EMA | 2,2,2-trifluoroethyl methacrylate | ABCR, Karlsruhe, Germany |
| FBMA | 4,4,4,3,3,2,2-heptafluorobutylmethacrylate | Sigma-Aldrich |
| FC1 | Low viscosity fluoropolymer made from VDF/HFP/TFE copolymer having a theoretical monomer ratio of 32.6 wt % VDF/ 43.3 wt % HFP/24.1 wt % TFE; Tg −12° C. | Can be prepared similar to Example 4 of U.S. Pat. No. 6,693,152 |
| F5STYR | Pentafluorostyrene | Sigma-Aldrich |
| VAZO-88 | 1,1'-Azobis(cyclohexanecarbonitrile) | Sigma-Aldrich |
| VAZO 67 | 2,2'azobis-(2-methylburyronitrile) | The Chemours Co., Wilmington, DE |
| MEHQ | Hydroquinone monomethylether | Sigma Aldrich |

-continued

Materials Table

| Designation | Descriptor | Supplier |
|---|---|---|
| MMA | Methyl methacrylate | Brentag AG, Mulheim, Germany |

Synthesis of MEFBSEIEM

A 500 ml 3 neck flask was charged with 100 g MEFBSE, 0.05 g Phenothiazine and 0.02 g MEHQ, and 175 g ethylacetate (EtAc). The mixture was stirred, warmed up until 65° C. and 15% of the EtAc was distilled off under mild vacuum with a Dean-Stark apparatus. Then the reaction mixture was put under nitrogen and lined out at 50° C. 0.2 g Dibutyltin laurate (Merck & Co., Kenilworth, N.J.) was added. Then 43.4 g isocyanato ethyl methacrylate (IEM) was slowly added such that the temperature did not exceed 65° C. The reaction was followed with IR (infrared spectroscopy) and stopped until the peak at 2272 cm$^{-1}$ disappeared. After reaction, the solvent is removed under vacuum which gave a white solid after cooling. The structure was confirmed with NMR (nuclear magnetic resonance).

The composition of the low molecular weight fluorinated polymer derived from ethylenically unsaturated fluorinated monomers, used in the examples is provided in Table 1 (TACK1 to TACK 20).

Synthesis of low molecular weight fluorinated polymers derived from fluorinated (meth)acrylate monomers:

Glass bottles were charged with the monomers, n-butylacetate and chain transfer agent (CTA) in amounts as given in Table 1. The amount of solvent was calculated to have a solids content between 50 and 70% by weight. The bottles were sealed and rolled during 2 hr to homogenize the mixture. Then 0.3% by weight of thermal initiator VAZO-88 (used as a 1% solution in n-butylacetate) was added. The bottles were degassed with a nitrogen flow of 1.0 liter/min during 3 minutes and then sealed. The reaction was run during 20 hours in a Launder-O-Meter set at 80° C. The composition of the fluorinated polymers was analyzed with GPC and DSC as described above. Mn, Mw, Tg and the % solids are reported in Table 1.

Synthesis of Low Molecular Weight Fluorinated Polymers Derived from Fluorinated Vinyl Ether Monomers and Vinylacetate Comonomers PPVE2/VA (molar ratio 1:1; weight ratio 83/17)

Into a 16 ounce bottle were charged with 27 g of PPVE2, 5.62 g of vinyl acetate, 0.96 g of Vazo 67 and 32.4 g of ethyl acetate. The solution was purged with nitrogen for 2 minutes and sealed. The bottle was thermostated at 65° C. in a Lauder-o-meter for 24 hours. The prepared solution was used as such.

PPVE2/VA (molar ratio 1:2; weight ratio 71/29)

Into a 16 oz bottle were charged 27 g of PPVE2, 11.24 g of vinyl acetate, 0.96 g of Vazo 67 and 38 g of ethyl acetate. The solution was purged with nitrogen for 2 minutes and sealed. The bottle was thermostated at 65° C. in a Lauder-o-meter for 24 hours. The prepared solution was used as such.

Synthesis of POLY-F5STYR

A 100 ml 3 neck flask was charged with 25 g pentafluorostyrene, 25 g butylacetate, and 3 g PETMP. The mixture was stirred under nitrogen flow during 30 min. Then the mixture was warmed up to 100° C. At a temperature of 50° C., 0.05 g VAZO-88 was added. The reaction was stirred during 24 h. After 2 hr and 16 hr additional shots of 0.05 g VAZO-88 were added.

TABLE 1

Composition of low molecular weight fluorinated polymers used as tackifiers (TACK)

| Tackifier | Monomers | % by weight | CTA (PPH monomer) | Tg | Mn (kg/mole) | Mw (kg/mole) | % solids |
|---|---|---|---|---|---|---|---|
| TACK 1 | C4MA | 100 | PETMP (20) | 1.0 | 3.1 | 3.8 | 60 |
| TACK 2 | C4MA/NVC | 99/1 | PETMP (20) | 1.8 | 3.2 | 3.8 | 60 |
| TACK 3 | C4MA/NVC | 97/3 | PETMP (20) | 4.2 | 3.2 | 3.8 | 60 |
| TACK 4 | C4MA/IBOMA/NVC | 75/24/1 | PETMP (30) | −6.0 | 2.3 | 2.6 | 50 |
| TACK 5 | C4MA/NVC/AEBP | 98.5/1/0.5 | PETMP (30) | −13.0 | 2.4 | 2.8 | 50 |
| TACK 6 | C4MA/NVC/AEBP | 98/1/1 | PETMP (29) | −8.0 | 2.1 | 2.7 | 60 |
| TACK 7 | C4MA/DMAEMA | 99/1 | PETMP (20) | −6.1 | 3.4 | 4.0 | 60 |
| TACK 8 | C4MA/DMAEMA | 97/3 | PETMP (20) | −13.1 | 3.1 | 3.7 | 60 |
| TACK 9 | C4MA | 100 | PETMP (25) | −8.0 | 2.2 | 2.8 | 60 |
| TACK 10 | C4MA | 100 | IOTG (12) | 2.0 | 1.9 | 3.0 | 60 |
| TACK 11 | C4MA | 100 | DIPETMP (30) | −6.0 | 2.7 | 3.5 | 60 |
| TACK 12 | C4MA/AEBP | 95/5 | IOTG (15) | ND | ND | ND | 60 |
| TACK 13 | C4MA/AEBP | 95/5 | PETMP (25) | ND | ND | ND | 60 |
| TACK 14 | MEFBSEIEM/NVC | 99/1 | PETMP (20) | 10.5 | 2.0 | 3.9 | 40 |
| TACK 15 | MEFBSEIEM/C4MA | 50/50 | PETMP (16) | 11.7 | 3.9 | 6.3 | 40 |

TABLE 1-continued

Composition of low molecular weight fluorinated polymers used as tackifiers (TACK)

| Tackifier | Monomers | % by weight | CTA (PPH monomer) | Tg | Mn (kg/mole) | Mw (kg/mole) | % solids |
|---|---|---|---|---|---|---|---|
| TACK 16 | MEFBSEIEM/MMA | 95/5 | PETMP (16) | 15.6 | 3.5 | 5.0 | 40 |
| TACK 17 | PF5STYR | 100 | PETMP (12) | 28.3 | 3.5 | 4.3 | 48 |
| TACK 18 | FC1 | / | / | −11.8 | 15.4 | 41.2 | 30 |
| TACK 19 | PPVE2/VA | 83/17 | / | ND | 6.5* | 12.6* | 50 |
| TACK 20 | PPVE2/VA | 71:29 | / | ND | 8.8* | 20.4* | 50 |
| TACK 21 | CF₃EMA | 100 | PETMP (25) | −13.7 | 2.3 | 3.3 | 60 |
| TACK 22 | FBMA/NVC/AEBP | 97/1.5/1.5 | PETMP (15.5) | −13.2 | 3.2 | 4.0 | 60 |

ND = not determined,
*molecular weight determined using GPC-Method 2, all others determined using GPC-Method 1.

Procedure for Making Adhesive Layers

Adhesive layers were prepared by solution processing. Therefore, solvent based mixtures were prepared having a composition as indicated in the examples. Adhesive layers were made by knife coating the solvent based mixture onto a double-sided siliconized paper liner (available from Mondi Akrosil, USA) having a thickness of 75 μm. Unless otherwise indicated, the coatings were dried at room temperature during 6 minutes, followed by drying 105° C. during 7 min and 1 min at 120° C. The thickness of the dried adhesive layer is recorded in the examples. After drying, the adhesives were laminated on a 50 μm thick nanoetched PET backing. The liner side was always used for measuring adhesive properties (180° Peel and Static Shear, as indicated in the test methods above).

EXAMPLES

Examples 1 to 6 and Reference Example REF 1

A designed experiment was run on different combinations of a low molecular weight fluorinated polymer derived from a fluorinated methacrylate monomer TACK 5, Fluoropolymer 1 and Fluorinated plasticizer 1. Therefore, 63% solids mixtures were prepared by blending Fluoropolymer 1 (solubilized in acetone) with TACK 5 (60% solids in butylacetate, preparation as outlined above) and Fluorinated plasticizer 1 (100% solids) in amounts as given in table 2. Adhesive layers were prepared from solution according to the general method as outlined above. The coating thickness of the dried adhesive layers was 50 μm+/−2 μm. Dynamic mechanical testing was performed according to the method as outlined above.

The composition of the samples and the rheology data are listed in table 2.

TABLE 2

| | Amount used (parts solid) | | | Storage modulus (G') 25° C., 1 rad/s (10⁵ Pa) | DMA $T_g$ ° C. |
|---|---|---|---|---|---|
| Example | Fluoropolymer 1 | TACK 5 | Fluorinated plasticizer 1 | | |
| EX 1 | 100 | 60 | 0 | 2.44 | −5.5 |
| EX 2 | 100 | 33 | 133 | 1.08 | −17.5 |
| EX 3 | 100 | 16 | 16 | 3.37 | −14.0 |
| EX 4 | 100 | 150 | 150 | 0.47 | −9.1 |
| EX 5 | 100 | 50 | 50 | 1.59 | −10.9 |
| EX 6 | 100 | 133 | 33 | 0.67 | −6.1 |
| REF 1 | 100 | 0 | 0 | 4.71 | −19.9 |

TABLE 2a

Storage and loss modulus (in Pa)

| Ex | G' at 0.01 rad/s | G' at 100 rad/s | G'' at 0.01 rad/s | G'' at 100 rad/s | G' at 1 rad/s |
|---|---|---|---|---|---|
| Ex 1 | 4.44 × 10⁴ | 7.29 × 10⁵ | 4.54 × 10⁴ | 6.93 × 10⁵ | 2.46 × 10⁵ |
| Ex 4 | 6.07 × 10³ | 4.15 × 10⁵ | 6.51 × 10³ | 4.91 × 10⁵ | 6.04 × 10⁴ |
| Ex 5 | 2.1 × 10⁴ | 3.41 × 10⁵ | 1.72 × 10⁴ | 2.58 × 10⁵ | 1.09 × 10⁵ |

The results indicate that Fluoropolymer 1, TACK 5 and Fluorinated plasticizer 1 are miscible because only a single glass transition temperature was observed. It was further confirmed that TACK 5 acts as a tackifier since it raises the Tg of the mixture and reduces the G' at 25° C. and 1 rad/s. It was further confirmed that the fluorinated methacrylate polymer TACK 5 acts as a tackifier and that Fluorinated plasticizer 1 acts as a plasticizer.

The adhesive layers of examples 1 to 6 and Reference example REF 1 were tested for 180° peel adhesion, Static Shear, Chemical resistance, Swell Test Ratio and Liner Release according to the general methods outlined above. The results are recorded in table 3.

TABLE 3

| Example | Thickness μm | 180° peel adhesion SS (TM-2) N/dm | Aged peel SS (TM-3) N/dm | RT static shear SS 1 kg/1 inch by 1 inch (min) | Chemical resistance test rating Oleic acid | Chemical resistance test rating IPA/H$_2$O 70/30 | Swell test ratio Oleic acid | Swell test ratio IPA/H$_2$O 70/30 | Liner release g/inch |
|---|---|---|---|---|---|---|---|---|---|
| EX 1 | 50 | 40.3 | 97.9 | 3788 | 5 | 1 | 1.00 | EX 1 | 50 |
| EX 2 | 50 | 73.8 | 146.1 | 502 | 5 | 3 | 1.00 | 1.04 | 23.2 |
| EX 3 | 50 | 23.0 | ND | 10000+ | 5 | 3 | 1.00 | 1.04 | 27.9 |
| EX 4 | 50 | 136.4 | ND | 87 | 5 | 1 | 1.00 | 1.05 | 21.2 |
| EX 5 | 55 | 54.3 | 112.1 | 3184 | 5 | 3 | 1.00 | 1.04 | 21.4 |
| EX 6 | 50 | 17.1 | ND | 215 | 5 | 1 | 1.00 | 1.02 | 23.7 |
| REF 1 | 50 | 9.2 | ND | 10000+ | 5 | 3 | 1.00 | 1.03 | 31.3 |

ND: not determined

Examples 7 to 10

In examples 7 to 10, fluorinated PSA's comprising a low molecular weight fluorinated polymer derived from a fluorinated methacrylate monomer and optional comonomers and high molecular weight fluoropolymer having various molecular weight were evaluated. Therefore, 63% solids mixtures were prepared by blending 100 parts (solids) fluoropolymer as indicated in table 4 (solubilized in acetone) with 50 parts (solids) TACK 6 (from 60% solids mixture in n-butylacetate, preparation as outlined above) and 400 parts Fluorinated Plasticizer 1 (100% solids). Adhesive layers were prepared according to the general procedure outlined above. Test specimen were prepared for the static shear and 180° peel, chemical resistance, swell test and liner release measurements as previously described. The coating thickness of the dried adhesive layers was 50 μm+/−2μ. The test results are presented in Table 4.

TABLE 4

| Example | Fluoropolymer | 180° peel adhesion SS (TM-1) N/dm | RT static shear SS 1 kg/1 inch by 1 inch (min) | Chemical resistance test rating Oleic acid | Chemical resistance test rating 70 IPA/30 H$_2$O | Swell test ratio Oleic acid | Swell test ratio 70 IPA/30 H$_2$O | Liner release g/inch |
|---|---|---|---|---|---|---|---|---|
| EX 7 | 1 | 120.0 | 976 | 5 | 3 | 1.00 | 1.04 | 29.5 |
| EX 8 | 2 | 122.1 | 1625 | 5 | 3 | 1.00 | 1.06 | 15.5 |
| EX 9 | 3 | 61.4 | 89 | 5 | 3 | 1.00 | 1.07 | 14.2 |
| EX 10 | 4 | 104.3 | 5333 | 5 | 3 | 1.00 | 1.10 | 12.1 |

Examples 11 to 14

In examples 11 to 14, low molecular weight fluorinated polymers derived from fluorinated (meth)acrylate monomers and optional comonomers, prepared using different chain transfer agents were evaluated as tackifiers for fluorinated pressure sensitive adhesives. The adhesive formulations were prepared according to the general procedure outlined above using 63% solids mixtures containing 100 parts (solids) Fluoropolymer 1 (solubilized in acetone), 350 parts (100% solids) of Fluorinated Plasticizer 1 or Fluorinated Plasticizer 2 (as indicated in table 5) and 100 parts (solids) low molecular weight fluoropolymers (TACK 9 to TACK 11) as listed in table 5. Adhesives layers were prepared from solution according to the procedure for making adhesive layers as given above.

Test specimen were prepared for the static shear and 180° peel adhesion (TM-1) as previously described. The test results are presented in Table 5.

TABLE 5

| EX | Low molecular weight fluoropolymer | Fluorinated Plasticizer | Thickness (μm) | 180° peel TM-1 (1 day dwell) on FEP 6307 (N/dm) | RT shear on SS; 20 min dwell 1 kg/1 inch by 1 inch (min) |
|---|---|---|---|---|---|
| EX 11 | TACK 9 | 1 | 60 | 95.3 | 28 |
| EX 12 | TACK 9 | 2 | 62 | 50.8 | 10 |
| EX 13 | TACK 10 | 1 | 60 | 50.0 | 55 |
| EX 14 | TACK 11 | 1 | 60 | 54.7 | 40 |

Examples 15 to 19

In examples 15 to 19 various low molecular weight fluoropolymer derived from fluorinated methacrylate monomers and optional comonomers were evaluated as tackifier in fluorinated PSA formulations. Therefore, 63% solids mixtures were prepared according to the general procedure outlined above by blending 100 parts (solids) Fluoropolymer 1 (solubilized in acetone) with 350 parts Fluorinated Plasticizer 1 and 100 parts (solids) of various low molecular weight fluoropolymers as listed in table 6. The adhesives were prepared from solution according to the general procedure for making adhesive layers as given above. The coating thickness of all adhesives was 60 μm+/−2 μm.

Test specimen were prepared for the static shear and 180° peel adhesion (TM-1) as previously described. The test results are presented in Table 6.

TABLE 6

| Example | Low molecular weight fluoropolymer | 180° peel TM-1 (1 day dwell) on FEP 6307 (N/DM) | RT shear on SS; 20 min dwell 1 kg/1 inch by 1 inch (min) |
|---|---|---|---|
| EX 15 | TACK 1 | 35.8 | 51 |
| EX 16 | TACK 2 | 108.3 | 44 |
| EX 17 | TACK 7 | 32.7 | 49 |
| EX 18 | TACK 3 | 100.0 | 53 |
| EX 19 | TACK 8 | 92.5 | 58 |

Examples 20 to 28

In examples 20 to 28 fluorinated PSA formulations were prepared comprising different high molecular weight fluoropolymers (Fluoropolymer 5 or 6) and different low molecular weight fluoropolymer prepared from methacrylate monomers and optional comonomers. No plasticizer was added. Therefore, 63% solids mixtures were prepared by blending 100 parts (solids) Fluoropolymer as given in table 7 (solubilized in acetone) with various low molecular weight fluoropolymers in amounts as listed in table 7. The adhesive formulations were coated on nanoetched PET backing and dried during 7 min at 105° C. followed by 1 min at 120° C. The dried adhesive of example 25 was additionally irradiated with 2 times 70 mJ/cm$^2$ (UV-C; measured with a Power Puck from EIT inc.) under a medium pressure mercury lamp (available from TCS Technologies). In all cases, clear coatings were obtained.

Test specimen were prepared for the static shear and 180° peel adhesion on stainless steel (TM-1) as previously described. The test results are presented in Table 7.

TABLE 7

| | Composition (parts solid) | | | 180° PEEL TM-1 (1 day dwell) on SS (N/DM) | RT Shear on SS; 20 min dwell 1 kg/1 inch by 1 inch (min) |
|---|---|---|---|---|---|
| Example | Fluoropolymer (100 parts) | Fluorinated Tackifier(parts) | Thickness (µm) | | |
| Ex 20 | 5 | TACK 2 (100) | 58 | 85.0 | 1244 |
| Ex 21 | 6 | TACK 9 (100) | 59 | 96.9 | 99 |
| Ex 22 | 6 | TACK 9 (50) | 60 | 85.0 | 67 |
| Ex 23 | 6 | TACK 12 (100) | 59 | 151.2 | 178 |
| Ex 24 | 6 | TACK 13 (100) | 63 | 105.9 | 90 |
| Ex 25 | 6 | TACK 13 (100) | 63 | 125.2 | 121 |
| Ex 26 | 6 | TACK 14 (50) | 60 | 157.5 | 608 |
| Ex 27 | 6 | TACK 15 (50) | 60 | 62.2 | 1117 |
| Ex 28 | 6 | TACK 16 (50) | 60 | 93.3 | 1625 |

Examples 29 to 37

In examples 29 to 37 fluorinated PSA formulations were prepared comprising different high molecular weight fluoropolymers and low molecular weight fluoropolymers derived from fluorinated vinyl or styrene monomers. The formulations optionally comprised a fluorinated plasticizer. The composition of the fluorinated PSA formulations is listed in table 8. In all cases, 63% solids mixtures were prepared by blending 100 parts (solids) Fluoropolymer as given in table 8 (solubilized in acetone) with various low molecular weight fluoropolymers in amounts as listed in table 8. The adhesives were prepared from solution according to the procedure for making adhesive layers as given above.

Test specimen were prepared for the static shear and 180° peel adhesion on stainless steel (TM-1 or TM-2) as previously described. The test results are presented in Table 9.

TABLE 8

| | Fluoropolymer | Fluorinated tackifier | | Fluorinated plasticizer | |
|---|---|---|---|---|---|
| Example | Composition (100 parts) | Composition | Parts (solid) | Composition | Parts (solid) |
| Ex 29 | 6 | TACK 18 | 100 | None | |
| Ex 30 | 1 | TACK 18 | 50 | 1 | 300 |
| Ex 31 | 5 | TACK 18 | 50 | 1 | 300 |
| Ex 32 | 1 | TACK 17 | 50 | 1 | 350 |
| Ex 33 | 1 | TACK 17 | 100 | 1 | 350 |
| Ex 34 | 7 | TACK 18 | 200 | None | |
| Ex 35 | 7 | TACK 18 | 50 | None | |
| Ex 36 | 2 | TACK 19 | 50 | 1 | 50 |
| Ex 37 | 2 | TACK 20 | 50 | 1 | 50 |

TABLE 9

| Example | Thickness (µm) | 180° PEEL TM-1 (1 day dwell) or TM-2 (15 min dwell) on SS (N/DM) | RT Shear on SS; 20 min dwell 1 kg/1 inch by 1 inch (min) |
|---|---|---|---|
| Ex 29 | 63 | 24.8 (TM-1) | 342 |
| Ex 30 | 60 | 102.4 (TM-1) | 63 |
| Ex 31 | 57 | 55.5 (TM-1) | 11 |
| Ex 32 | 60 | 120.6 (TM-1) | 389 |
| Ex 33 | 60 | 66.5 (TM-1) | 10000+ |
| Ex 34 | 60 | 88.2 (TM-1) | 542 |
| Ex 35 | 60 | 22.4 (TM-1) | 8000+ |
| Ex 36 | 50 | 37.9 (TM-2) | 10000+ |
| Ex 37 | 50 | 31.3 (TM-2) | 10000+ |

Example 38

In example 38, a fluorinated PSA was prepared comprising a high molecular weight fluoropolymer having a Tg of about −30° C. The adhesive composition was prepared at 63% solids by blending 100 parts (solids) Fluoropolymer 5 (solubilized in acetone) with TACK 5 and Fluorinated Plasticizer 1 in amounts as listed in table 10. The adhesive formulation was coated on a PET backing and dried during 7 min at 105° C. followed by 1 min at 120° C. A clear coating was obtained.

Test specimen were prepared for the static shear and 180° peel adhesion on PTFE (TM-1) as previously described. The test result is presented in Table 10.

TABLE 10

| | Composition (parts solid) | | | 180° PEEL TM-1 (1 day dwell) on PTFE (N/dm) |
|---|---|---|---|---|
| Example | Fluoropolymer (100 parts) | Parts TACK 5 | Parts Fluorinated Plasticizer 1 | |
| Ex 38 | 5 | 300 | 100 | 47.2 |

Examples 39 and 40

In examples 39 and 40 fluorinated PSA's comprising low molecular weight fluorinated polymers derived from fluorinated methacrylate monomers and optional comonomers, high molecular weight fluoropolymers 1 or 2 and fluorinated plasticizer 1 were evaluated. Therefore, 63% solids mixtures were prepared by blending 100 parts (solids) fluoropolymer as indicated in table 11 (solubilized in acetone) with TACK 21 or TACK 22 and Fluorinated Plasticizer 1 (100% solids) in amounts as given in Table 11. Adhesive layers were prepared according to the general procedure outlined above.

Test specimen were prepared for the static shear and 180° peel (TM-1 or TM-2), as previously described. The coating thickness of the dried adhesive layers was 60 μm+/−2 μm. The test results are presented in Table 12

TABLE 11

| Example | Fluoropolymer Composition (100 parts) | Fluorinated tackifier | | Fluorinated plasticizer | |
|---|---|---|---|---|---|
| | | Composition | Parts | Composition | Parts |
| Ex 39 | 1 | TACK 21 | 100 | Plasticizer 1 | 350 |
| Ex 40 | 2 | TACK 22 | 50 | Plasticizer 1 | 50 |

TABLE 12

| Example | Thickness (μm) | 180° PEEL TM-1 (1 day dwell) on FEP 6307 (N/DM) | 180° PEEL TM-2 (15 min dwell) on SS (N/DM) | RT Shear on SS; 20 min dwell 1 kg/1 inch by 1 inch (min) |
|---|---|---|---|---|
| Ex 39 | 60 | 59.4 | ND | 74 |
| Ex 30 | 60 | ND | 164 | 1584 |

ND = not determined

Foreseeable modifications and alterations of this invention will be apparent to those skilled in the art without departing from the scope and spirit of this invention. This invention should not be restricted to the embodiments that are set forth in this application for illustrative purposes. To the extent that there is any conflict or discrepancy between this specification as written and the disclosure in any document mentioned or incorporated by reference herein, this specification as written will control.

What is claimed is:

1. A pressure sensitive adhesive comprising:
   (a) a high molecular weight fluorinated polymer having at least one Tg less than about 0° C. and a number average molecular weight greater than about 20 kilograms/mole, wherein the high molecular weight fluorinated polymer is not a thermoplastic elastomer; and
   (b) a low molecular weight fluorinated polymer (i) derived from an ethylenically unsaturated fluorinated monomer, (ii) having a Tg greater than about −15° C., and (iii) a number average molecular weight less than about 18 kilograms/mole.

2. The pressure sensitive adhesive of claim 1, wherein the low molecular weight fluorinated polymer is derived from an acrylate monomer, a vinyl monomer, a styrene monomer, and combinations thereof.

3. The pressure sensitive adhesive of claim 1, wherein the low molecular weight fluorinated polymer is derived from vinylidene fluoride, hexafluoropropylene, tetrafluoroethylene, and combinations thereof.

4. The pressure sensitive adhesive of claim 1, further comprising a plasticizer.

5. The pressure sensitive adhesive of claim 4, wherein the plasticizer has a molecular weight less than 20,000 grams/mol and a Tg less than about −20° C.

6. The pressure sensitive adhesive of claim 4, wherein the plasticizer is fluorinated.

7. The pressure sensitive adhesive of claim 1, wherein the low molecular weight fluorinated polymer comprises a plurality of pendant sulfonylamide groups.

8. The pressure sensitive adhesive of claim 7, wherein the low molecular weight fluorinated polymer comprises a segment according to formula I:

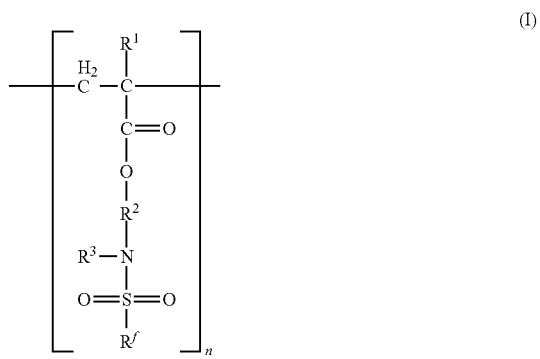

wherein $R^1$ is H or $CH_3$; $R^2$ is a linking group; $R^3$ is H or an alkyl group; $R_f$ comprises a fully fluorinated group; and n is at least 2.

9. The pressure sensitive adhesive of claim 1, wherein the low molecular weight fluorinated polymer comprises pendent perfluorinated diether moieties.

10. The pressure sensitive adhesive of claim 1, wherein the low molecular weight fluorinated polymer comprises a segment according to formula III:

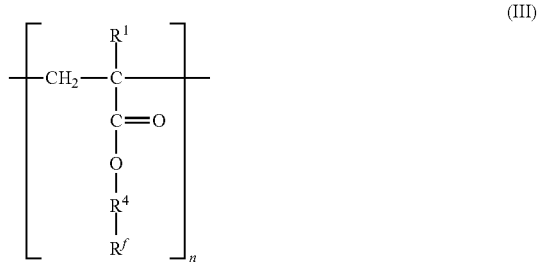

wherein $R^1$ is H or $CH_3$; $R^4$ is an alkylene group; $R_f$ comprises a fully fluorinated alkyl group; and n is at least 2.

11. The pressure sensitive adhesive of claim 1, comprising 10 to 200 parts of the low molecular weight fluorinated polymer to 100 parts of the high molecular weight fluorinated polymer.

12. The pressure sensitive adhesive of claim 4, comprising the plasticizer, wherein the pressure sensitive adhesive meets all of the following criteria:
   G' measured at an angular frequency of 0.01 rad/s is greater than $1 \times 10^3$ Pa;
   G' measured at an angular frequency of 100 rad/s is less than $1 \times 10^6$ Pa;
   G" measured at an angular frequency of 0.01 rad/s is greater than $1 \times 10^3$ Pa; and
   G" measured at an angular frequency of 100 rad/s is less than $1 \times 10^6$ Pa.

13. The pressure sensitive adhesive of claim 1, wherein the high molecular weight polymer comprises a functional pendent group, wherein the functional pendent group comprises at least one of —OH, —COOH, and combinations and salts thereof.

14. The pressure sensitive adhesive of claim 1, wherein the low molecular weight fluorinated polymer comprises a functional pendent group, and the functional pendent group comprises at least one of —OH, —COOH, and combinations and salts thereof.

15. The pressure sensitive adhesive of claim 1, wherein the high molecular weight fluorinated polymer is at least partially crosslinked.

16. The pressure sensitive adhesive of claim 1, further comprising, magnesium oxide, zinc oxide, sodium stearate, and magnesium oxalate.

17. The pressure sensitive adhesive of claim 1, wherein the Tg of the low molecular weight fluorinated polymer is higher than the at least one Tg of the high molecular weight fluorinated polymer.

18. The pressure sensitive adhesive according to claim 1, wherein the high molecular weight fluorinated polymer is an amorphous fluoropolymer.

19. The pressure sensitive adhesive according to claim 1, comprising 10 to 100 parts of the low molecular weight fluorinated polymer to 100 parts of the high molecular weight fluorinated polymer.

\* \* \* \* \*

UNITED STATES PATENT AND TRADEMARK OFFICE
CERTIFICATE OF CORRECTION

PATENT NO. : 10,822,533 B2
APPLICATION NO. : 16/322146
DATED : November 3, 2020
INVENTOR(S) : Francois D'Haese et al.

Page 1 of 1

It is certified that error appears in the above-identified patent and that said Letters Patent is hereby corrected as shown below:

On the Title Page

Item (72), Line 1, Under inventors, delete "Francois C. O'Haese" and insert -- Francois C. D'Haese --, therefor.

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*